(12) United States Patent
Groffils et al.

(10) Patent No.: US 12,256,725 B2
(45) Date of Patent: Mar. 25, 2025

(54) SYSTEM FOR CONTROLLING THE GROWTH OF WEEDS

(71) Applicants: TIENSE SUIKERRAFFINADERIJ NV, Tienen (BE); MEAM BV, Herent (BE)

(72) Inventors: Carlo Groffils, Herent (BE); Karel Groffils, Herent (BE)

(73) Assignees: TIENSE SUIKERRAFFINADERIJ N.V. (BE); MEAM BV (BE)

( * ) Notice: Subject to any disclaimer, the term of this patent is extended or adjusted under 35 U.S.C. 154(b) by 122 days.

(21) Appl. No.: 18/017,822

(22) PCT Filed: Jul. 23, 2021

(86) PCT No.: PCT/EP2021/070651
§ 371 (c)(1),
(2) Date: Jan. 24, 2023

(87) PCT Pub. No.: WO2022/018255
PCT Pub. Date: Jan. 27, 2022

(65) Prior Publication Data
US 2023/0270036 A1   Aug. 31, 2023

(30) Foreign Application Priority Data

Jul. 24, 2020   (EP) .................................... 20187733

(51) Int. Cl.
*A01M 21/04*   (2006.01)
*G06V 20/10*   (2022.01)

(52) U.S. Cl.
CPC ......... *A01M 21/046* (2013.01); *G06V 20/188* (2022.01)

(58) Field of Classification Search
CPC ....... A01B 39/18; A01M 21/00; A01M 21/04; H01Q 1/22; H01Q 1/28; H01Q 1/32; H01Q 3/26–30
See application file for complete search history.

(56) References Cited

U.S. PATENT DOCUMENTS

| 9,565,848 B2* | 2/2017 | Stowe .................. A01M 21/04 |
| 10,548,306 B2* | 2/2020 | Albert .................... A01M 7/00 |
| 2021/0153496 A1* | 5/2021 | Williams ............ A01M 21/046 |

FOREIGN PATENT DOCUMENTS

| CH | 563102 | 5/1975 | ............ A01G 11/00 |
| WO | WO2018112531 | 6/2018 | ............ A01M 21/04 |
| WO | WO2019144231 | 8/2019 | ............ A01B 39/06 |

OTHER PUBLICATIONS

International Search Report, Written Opinion and International Preliminary Report on Patentability dated Sep. 16, 2021, 20 pgs.

* cited by examiner

*Primary Examiner* — Hasan Islam
(74) *Attorney, Agent, or Firm* — HAYES SOLOWAY P.C.

(57) ABSTRACT

A mobile microwave system and method for controlling the growth of weeds present in soils, such as those of agricultural fields includes a microwave unit having a microwave generator for generating microwaves within a frequency range suitable for controlling weed growth. A phased array antenna system includes a plurality of antenna elements for emitting a focused microwave beam within a target area. At least one controllable phase shifter is coupled between the microwave unit and the plurality of antenna elements. The phase shifter is configured for shifting a microwave phase of a part of the microwaves in order to adjust a direction of the emitted microwave beam. The microwave beam direction is steerable to align the target area with a position of a target weed plant. The system is mountable to a vehicle or includes a drive for moving the system.

16 Claims, 8 Drawing Sheets

SYSTEM FOR CONTROLLING THE GROWTH OF WEEDS

FIELD OF THE INVENTION

The present invention is in the field of weed control systems and methods. In particular, the present invention provides a system for controlling by means of microwaves the growth of weeds present in soils, such as those of agricultural fields Also, methods for the same are provided.

BACKGROUND

Chemical weed control has dominated the farming market for the past decade. However, growing awareness about pollution, such as the presence of chemical residues or contaminants in the environment, is driving industry to shift to "cleaner" methods of weed control. One "clean" alternative is mechanical weed control, wherein the growth of weed plants is suppressed by pulling, mowing, mulching, tillage, or other physical activities that are performed on the soil. However, the systems for mechanical weed control are typically slow and inefficient, subject to wear and tear, and cause physical changes to the soil structure e.g. decrease erosion or water evaporation.

Another "clean" alternative involves the application of electromagnetic waves with a frequency in the microwave region (300 MHz to 300 GHz), i.e., microwaves, to control the growth of weeds. Microwaves are capable of heating plants through a process called dielectric heating, which allows water contained in the plant body to absorb energy from the microwaves. Unlike conventional heating, which produces the highest temperature at the plant surface, microwave heating produces its highest temperature in the core of the plant stem. This high core temperature may lead to irreversible damage in the water filled plant tissue, which ultimately leads to permanent wilting and death of the plant. Past trials and efforts were made to demonstrate that microwaves are indeed capable of killing a range of weed in the soil, but the developed systems never succeeded because of technical shortcoming or low economic feasibility.

Nonetheless, weed control by means microwave radiation has various advantages over chemical control methods. In particular, the microwave radiation does not leave behind any traces in the remaining plants or soils, such as chemical residues or contaminants, nor does it physically change the soil structure. Moreover, microwaves are not affected by wind or rain, which may allow for more varied or consistent applicability when compared to conventional spraying. Microwaves can also be targeted to selectively kill specific plant species or alternatively treat specific areas, without affecting any of the adjacent cultivated plants. Microwave properties can also be easily controlled to change the treatment conditions, for example by adjusting the output power. As such, the application of microwave systems could theoretically be a strong farming tool, which could improve the commercial viability of "clean" agricultural fields.

However, present microwave systems developed for farming have a very limited efficacy. They require very specific operating conditions, take too much time and/or too much power to effectively kill weed, and are non-selective to non-weed plants e.g. crops or foliage.

For example, WO 2019/144231 discloses an autonomous unmanned ground vehicle for pest control that comprises a drive mechanism to displace the vehicle among a plurality of plants; an image capture device to obtain images of the plurality of plants; a motorized arm with a free end displaceable with respect to the chassis; a microwave emitter mounted to the free end, displaceable therewith, and operable to emit microwaves; and a control system to operate the vehicle.

Accordingly, there is a demand for a novel system that can achieve the level of economic feasibility (i.e., in terms of cost and time efficiency) that is necessary to compete with other systems and methods of weed control, thereby alleviating the need for pesticides or other chemicals.

SUMMARY OF THE INVENTION

The present disclosure provides a system and methods for controlling the growth of weeds present in soils, such as those of agricultural fields, by means of microwaves. Also, methods for controlling the growth of weeds by means of microwaves are provided. Systems of the art for e.g. killing weed plants by means of microwave technology have a limited efficacy and are not economically feasible.

It has been observed that achieving an at least partially automated control of a weed population at a target area, such as a farming field, results in a more targeted approach to control of the microwave system, without the disadvantages of chemical weed control (e.g. pesticides and chemical residues) or alternative systems (e.g. steam, mechanical weeding, high voltage contact methods). The present disclosure provides for a microwave-based weed control system that may be more energy-efficient (i.e., lower power-consumption), faster (i.e., less time-consuming) and accurate (i.e., selective targeting), than similar systems. The present system may achieve the level of economic feasibility (i.e., cost and time efficiency) necessary to compete with and potentially surpass alternative systems and methods of weed control.

In an aspect the present disclosure concerns a mobile microwave system for controlling weed growth in a field. The system comprising a microwave unit comprising a microwave generator for generating microwaves within a frequency range suitable for controlling weed growth; a phased array antenna system comprising a plurality of antenna elements for emitting a focused microwave beam within a target area; at least one controllable phase shifter coupled between the microwave unit and the plurality of antenna elements; wherein the phase shifter is configured for shifting a microwave phase of at least a part of the generated microwaves in order to adjust a direction of the emitted microwave beam; wherein the microwave beam direction is steerable to align the target area with a position of a target weed plant; and wherein the mobile microwave system is mountable to a vehicle or comprises a drive means for moving said system.

In another aspect the present disclosure concerns a mobile microwave system for controlling weed growth in a field. The system comprising a microwave unit comprising a microwave generator for generating microwaves within a frequency range of at least 2.0 GHz to at most 6.0 GHz; a phased array antenna system comprising a plurality of antenna elements for emitting a focused microwave beam within a target area; at least one controllable phase shifter coupled between the microwave unit and the plurality of antenna elements; wherein the phase shifter is configured for shifting a microwave phase of at least a part of the generated microwaves in order to adjust a direction of the emitted microwave beam; wherein the microwave beam direction is steerable to align the target area with a position of a target weed plant; and wherein the mobile microwave system is mountable to a vehicle or comprises a drive means for moving said system.

In an embodiment system the microwave generator generates microwaves of frequency of at least 2.0 GHz, preferably at least 2.5 GHz; more preferably at least 3.0 GHz, even more preferably at least 3.5 GHz, even more preferably at least 4.0 GHz, even more preferably at least 4.5 GHz, even more preferably at least 5.0 GHz, even more preferably at least 5.5 GHz, and/or at most 6.0 GHz; for example 5.8 GHz.

In a preferred embodiment the microwave generator generates microwaves within a frequency range of at least 2.0 GHz to at most 6.0 GHz; more preferably at least 2.5 GHz to at most 6.0 GHz; even more preferably at least 3.0 GHz to at most 6.0 GHz; even more preferably at least 3.5 GHz to at most 6.0 GHz; even more preferably at least 4.0 GHz to at most 6.0 GHz; even more preferably at least 4.5 GHz to at most 6.0 GH; even more preferably at least 5.0 GHz to at most 6.0 GHz; even more preferably at least 5.5 GHz to at most 6.0 GHz; even more preferably at least 5.6 GHz to at most 5.9 GHz, or at least 5.7 GHz to at most 5.9 GHz In an embodiment the plurality of antenna elements is arranged in a substantially linear fashion.

In an embodiment at least one antenna element comprises one or more antenna apertures.

In an embodiment at least one antenna element, preferably all antenna elements, of the plurality of antenna elements is a horn antenna.

In an embodiment at least one antenna element, preferably all antenna elements, of the plurality of antenna elements is a dipole antenna.

In an embodiment at least one antenna element, preferably all antenna elements, of the plurality of antenna elements is patch antenna, preferably a microstrip antenna.

In a preferred embodiment the microwave generator is a solid-state microwave generator.

In an embodiment the mobile microwave system is mounted to a farm vehicle such as a tractor or a rail vehicle such as a train.

In an embodiment the system comprises a sensing unit operatively connected to the processing unit and configured for sensing the target weed in the target location; wherein the processing unit is configured to receive, from the sensing unit, sensing data representative a target location; determine, from the sensing data, the position of the target weed plant; and steer the microwave beam direction to align the target area with the determined position of the target weed plant.

In a preferred embodiment the system comprises a sensing unit operatively connected to the processing unit and configured for sensing the target weed in the target location; wherein the processing unit is configured to generate a detection grid representative of a target location consisting of a plurality of detection grid squares; receive sensing data from the sensing unit representative of a segment of the target location and assigning said sensing data to the grid square corresponding with said segment of the target location; detect the presence of a target weed in at least one grid square; flag the at least one grid square in which the presence of a target weed plant is detected as the position of a target weed plant; and, steer the microwave beam direction to align the target area with the determined position of the flagged grid square.

In an embodiment the system comprises a sensing unit comprising a camera configured for recording green colour, which is operatively connected to the processing unit and the processing unit is configured to determine a green colour value and detect, from the green colour value, the position of the target weed plant.

In an embodiment the system comprises a sensing unit comprising a camera configured for recording full colour spectrum, which is operatively connected to the processing unit and the and the processing unit is configured to determine a spectral signature and identify, from the spectral signature, a type of weed plant and the position of the target weed plant.

In a preferred embodiment the mobile microwave system comprises a processing unit operatively connected to the phase shifter of the phased array antenna system; wherein the processing unit is configured to receive location data corresponding to the position of the target weed plant; and steer the microwave beam direction to align the target area with the received location data.

In a preferred the processing unit is configured to identify for each grid square a weed plant type; determine for each grid square a microwave specific parameter suitable for controlling the growth of the identified weed plant type, the microwave parameter including frequency, intensity, exposure time, and/or optionally, a number of repetitions; control a microwave unit to generate microwaves corresponding to the determined microwave specific parameter.

In an embodiment the processing unit is configured to control a vehicle or a drive means to drive the mobile microwave system to the target location and/or the position of a target weed plant.

In a further aspect the present disclosure concerns a preferably computer-implemented method for controlling weed growth in a target location, such as an agricultural field, the method comprising:
   a) determining a position of a target weed plant in the target location;
   b) optionally, steering a vehicle or drive means to reach the target location;
   c) steering a microwave beam direction to align a target area with the position of the target weed plant; and
   d) emitting a focused microwave beam on the target area corresponding with the position of the target weed plant.

In an embodiment the determining of a position of a target weed plant comprises
   A) generating a detection grid representative of a target location consisting of a plurality of detection grid squares;
   B) receiving sensing data from a sensing unit representative of a segment of the target location and assigning said sensing data to the grid square corresponding with said segment of the target location;
   C) determining the presence of a target weed in at least one grid square;
   D) flagging the at least one grid square in which the presence of a target weed plant is detected as the position of a target weed plant.

In an embodiment the emitting of a focused microwave beam on the target area comprises
   d) emitting a focused microwave beam on a first target area, preferably a first flagged grid square, corresponding with the position of a first target weed plant;
   e) steering the focused microwave beam direction to align with the position of a second target grid area, preferably second flagged grid square, corresponding with the position of a second target weed plant;

f) repeating the above steps for each further target grid area, preferably further flagged grid square, corresponding with the position of each further target weed plant.

In an embodiment the determining the presence of a target weed comprises
i) determining the presence of green colour in each grid square;
ii) assigning a numerical value representative of the amount of green colour to each grid square; and
iii) detecting the presence of the target weed plant in each grid square if the assigned numerical value exceeds a pre-determined threshold value.

In an embodiment the determining the presence of a target weed comprises
I) detecting the presence of a plant;
II) determining a plant specific parameter for the detected plant, said plant specific parameter including at least a spectral signature for said plant;
III) comparing the determined plant specific parameter with data stored on a database, said data including at least spectral signature data corresponding to a weed plant and/or a non-weed plant;
IV) identifying the detected plant as a weed plant or as a non-weed plant.

In a preferred embodiment the computer-implemented method may be executed by means of the herein disclosed mobile microwave system.

In a further aspect the present disclosure concerns a use of a mobile microwave system as described herein for controlling the growth of weed in a field. In an embodiment the use is for controlling the growth of one or more of the following plants or seeds thereof: saltbush, bindweed, thistle, yarrow, shaggy soldier, summer purslane, red clover, peach herb, camomile, nettle, grass, maranth, bermuda grass, bindweed, broadleaf plantain, burdock, common lambsquarters, creeping charlie, dandelion, goldenrod, knotweed and the knotweed family, kudzu, leafy spurge, milk thistle, poison ivy, ragweed, sorrel, striga, st. john's wort, sumac, tree of heaven, wild carrot, white clover, wood sorrel, yellow nutsedge, pigweed, goosefoots, fools parsley, mercury and the spurge family, black nightshade, speedwell.

BRIEF DESCRIPTION OF THE DRAWINGS

The following description of the figures of specific embodiments of the disclosure is merely exemplary in nature and is not intended to limit the present teachings, their application or uses.

Throughout the drawings, the corresponding reference numerals indicate the following parts and features: (100) mobile microwave system; (200) microwave unit; (210) microwave generator; (250) leaky-wave antenna; (255) leaky-wave antenna shield; (270) slotted line antenna; (300) vehicle; (350) phased array antenna system; (360) antenna element; (365) antenna aperture; (370) phase shifter; (380) power divider; (400) weed plant; (450) non-weed plant e.g. crop; (500) sensing unit; (550) processing unit.

DETAILED DESCRIPTION

Figure 1:
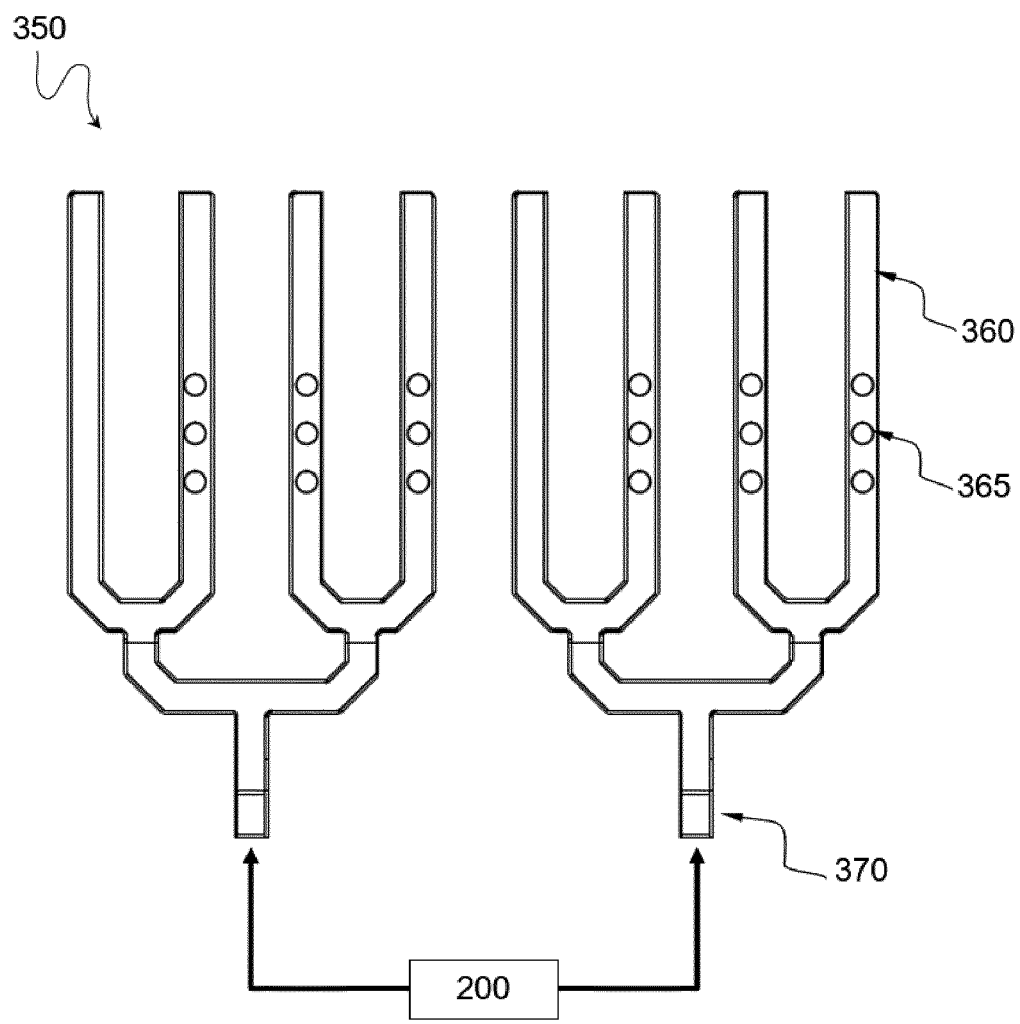
FIG. 1 is a schematic of a phased array antenna system (350) according to a preferred embodiment of the present invention.

The present invention will be described with respect to particular embodiments, but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps. The recitation of numerical ranges by endpoints includes all numbers and fractions subsumed within the respective ranges, as well as the recited endpoints.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention. All documents cited in the present specification are hereby incorporated by reference in their entirety.

The terms "left," "right," "front," "back," "top," "bottom," "over," "under," "superior," "distal," "inferior," "proximal," "lateral," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. "Distal" and "proximal" typically refer to "distal" and "proximal" relative positions with respect to the adhesive patch and/or the skin to which the adhesive patch is applied. "Inferior" and "superior" typically refer respectively to "proximal" and "distal" in that same context.

The term "coupled," as used herein, is defined as directly or indirectly connected in an electrical or nonelectrical (i.e., physical) manner objects described herein as being "adjacent to" each other may be in physical contact with each other, in close proximity to each other, or in the same general region or area as each other, as appropriate for the context in which the phrase is used.

The term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Occurrences of the phrase "in one embodiment," or "in one aspect," herein do not necessarily all refer to the same embodiment or aspect. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and description, any of the claimed or described embodiments can be used in any combination.

In addition, it should be understood that embodiments of the invention may include hardware, software, and electronic components or modules that, for purposes of discussion, may be illustrated and described as if the majority of the components were implemented solely in hardware or software. However, one of ordinary skill in the art, and based on a reading of this detailed description, would recognize that, in at least one embodiment, the electronic based aspects of the invention may be implemented in software (e.g., instructions stored on non-transitory computer-readable medium) executable by one or more processing units, such as a microprocessor and/or application specific integrated circuits.

The processing unit may be configured for executing the herein presented methods. Embodiments may be implemented in code and may be stored on a storage medium having stored thereon instructions which can be used to program a system to perform the instructions. For purposes of the present disclosure, the terms "code" or "program" cover a broad range of components and constructs, including applications, drivers, processes, routines, methods, modules, and subprograms. The terms "code" or "program" may thus be used to refer to any collection of instructions which, when executed by a processing system, performs a desired operation or operations. Additionally, alternative embodiments may include processes that use fewer than all of the disclosed operations, processes that use additional operations, processes that use the same operations in a different sequence, and processes in which the individual operations disclosed herein are combined, subdivided, or otherwise altered. Those skilled in the art can appreciate the numerous modifications and variations thereon.

Accordingly, the herein described hardware may comprise a processing unit that is configured for executing the herein presented methods as software. Embodiments of the methods may be implemented in code and may be stored on a storage medium having stored thereon instructions which can be used to program a system to perform the instructions. For purposes of the present disclosure, the terms "code" or "program" cover a broad range of components and constructs, including applications, drivers, processes, routines, methods, modules, and subprograms. The terms "code" or "program" may thus be used to refer to any collection of instructions which, when executed by a processing system, performs a desired operation or operations. Additionally, alternative embodiments may include processes that use fewer than all of the disclosed operations, processes that use additional operations, processes that use the same operations in a different sequence, and processes in which the individual operations disclosed herein are combined, subdivided, or otherwise altered. Those skilled in the art can appreciate the numerous modifications and variations thereon.

The present disclosure generally relates to a system and methods for controlling the growth of weeds that are present in soils, such as those of agricultural fields, by means of microwaves. In particular, the present disclosure presents a mobile microwave system adapted to emit microwave radiation onto the soil, thereby damaging at least part of the plant body, which may include the plant leafs, stem, roots and/or seeds that are present in the soil. The emitted microwave radiation will typically heat at least part of the plant body up to a temperature that is suitable to substantially damage it, which may subsequently cause the plant to wilt and die.

It has been found that increasing the internal temperature at least part of the plant body to about 50° C. may result in the definite killing of general weed. The most suitable temperature might depend on the targeted plant type and stage of plant growth and may therefore need to be adjusted when applied onto different plant types and growth stages, but also geographical differences, such as the soil and climate, seasonal differences, rainy or stormy weather, and so on.

It has been observed that the present system is particularly well suited for controlling the growth of immature weeds, i.e., weed plants that are still in an earlier stage of development and have a narrower plant stem. At an immature stage the weed has already developed into a seedling with a narrow stem. Nonetheless, it is understood that the present system may be adapted to also target weeds in the germination stage, i.e., seeds present in the soil, or in a mature stage, i.e., having a thicker plant stem.

Weed in the present description refers to a plant considered undesirable in a particular situation or environment, which typically includes non-crop plants in an agricultural field that compete with desired plants for space, nutrients, water and/or light. Exemplary weed plants may include Saltbush, bindweed, thistle, yarrow, shaggy soldier, summer purslane, red clover, peach herb, camomile, nettle, grass, amaranth, Bermuda grass, Bindweed, Broadleaf plantain, Burdock, Common lambsquarters, Creeping charlie, Dandelion, Goldenrod, knotweed and the knotweed family, Kudzu, Leafy spurge, Milk thistle, Poison ivy, Ragweed, Sorrel, *Striga*, St. John's wort, Sumac, Tree of heaven, Wild carrot, White clover, Wood sorrel, Yellow nutsedge, pigweed, goosefoots, fools parsley, mercury and the spurge family, black nightshade, speedwell, and the like.

By controlling the growth of weeds using the present system, the growth of desired plants such as crops or other productive plants may be improved, which may increase the yield of agricultural fields. Exemplary crop plants may include sugar beets, fodder beets, red beets, sugar cane, barley, maize, millet, rye, sorghum, wheat, cassava, potatoes, chicory, peas, beans, cabbages, carrots, flax, rapeseed, sunflower, vegetable crops like cabbages, fruit trees, berry shrubs, and the like.

As outlined in the background section, systems of the art for e.g. killing weed plants by means of microwave technology have a limited efficacy and are not economically feasible. It has been identified that achieving an at least partially automated control of a weed population at a target area, such as a farming field, results in a more targeted approach to control of the microwave system, without the disadvantages of chemical weed control (e.g., pesticides and chemical residues) or alternative systems (e.g., steam, mechanical weeding, high voltage contact methods). The present disclosure provides for a microwave-based weed control system that may be more energy-efficient (i.e., lower power-consumption), faster (i.e., less time-consuming) and accurate (i.e., selective targeting), than similar systems. As a result, the present disclosure may achieve the level of economic feasibility (i.e., cost and time efficiency) that is necessary to compete with and potentially surpass alternative systems and methods of weed control.

An aspect of the present disclosure relates to a mobile microwave system for controlling the growth of weed in a field. The mobile microwave system may comprise: a microwave unit comprising a microwave generator for generating microwaves within a frequency range suitable for controlling weed growth, preferably a microwave frequency range of at least 2.0 GHz to at most 6.0 GHz; a phased array antenna system comprising a plurality of antenna elements for emitting a focused microwave beam within preferably onto a target area; at least one controllable phase shifter coupled between the microwave unit and the plurality of antenna elements; wherein the phase shifter is configured for shifting a microwave phase of at least a part of the generated microwaves in order to adjust a direction of the emitted microwave beam; wherein the microwave beam direction is steerable to align the target area with a position of a target weed plant; wherein the mobile microwave system is mountable to a vehicle or comprises a drive means for moving said system.

A further aspect of the present disclosure relates to a mobile microwave system for controlling the growth of weed in a field, the system comprising: the mobile microwave system as described herein; a processing unit operatively connected to the phase shifter of the phased array antenna system; which is configured to receive location data corresponding to the position of the target weed plant; and steer the microwave beam direction to align the target area with the received location data.

Microwaves occupy a place in the electromagnetic spectrum within a frequency range between 300 GHz to 300 MHz. The basic electromagnetic wave equation, i.e., $$P = 2 \cdot \pi \cdot \varepsilon_0 \cdot \varepsilon'' \cdot E^2 \cdot V,$$

shows that the absorbed microwave power directly depends on the frequency of the microwaves, i.e. higher microwave frequency means a shorter wavelength and hence more microwave power. As such, generating higher frequency microwaves may result in a faster heating of a target, such as a weed plant, at the cost of reduced target size or volume.

Nonetheless, the electromagnetic wave penetration depth equation, i.e., $$P_D = \frac{\lambda \sqrt{\varepsilon'_r}}{2 \cdot \pi \cdot \varepsilon'_r}$$

shows that increasing the frequency of microwaves also reduces the depth to which the microwaves can penetrate into a target, such as the plant. In view thereof, the present disclosure aims to solve the problem of finding a suitable microwave frequency for efficiency control of weed growth.

The term "controlling weed growth" as used herein with reference to emitted microwaves indicates that the microwaves are suitable for preventing the growth of weed plants, specifically by at least stopping or slowing down the growth of a weed plant, and preferably by burning, killing and/or lethal wilting of the weed plant with high heat.

As discussed above with reference to the basic electromagnetic wave equation, the microwave frequency and power can be adjusted for controlling weed growth. However, the most suitable settings depend on various growing and environmental factors, such as the targeted plant type and stage of plant growth, but also climate, region, soil, weather conditions, and so on. Nonetheless, it was found that a microwave frequency range according to embodiments in the present disclosure can be considered as suitable for controlling the growth of the most commonly occurring weed plants in western soils. The below described exemplary embodiments aim to guide the skilled person in selecting a frequency range suitable for controlling the growth of weed plants. It is, however, appreciated that the skilled person is capable of adjusting the microwave frequency to more suitable settings when adjusting the present system to different growing and environmental factors.

The microwave generator may be configured for generating microwaves generating microwaves within a frequency range of at least 2.0 GHz to at most 6.0 GHz; preferably at least 3.0 GHz, more preferably at least 4.0 GHz, even more preferably at least 5.0 GHz, even more preferably about 5.8 GHz. The generated microwaves may have a frequency of at least 2.0 GHz; or 2.1 GHz, or 2.2 GHz, or 2.3 GHz, or 2.4 GHz, or 2.5 GHz, or 2.6 GHz, or 2.7 GHz, or 2.8 GHz, or 2.9 GHz; preferably at least 3.0 GHz, more preferably at least 3.1 GHz, or 3.2 GHz, or 3.3 GHz, or 3.4 GHz, or 3.5 GHz, or 3.6 GHz, or 3.7 GHz, or 3.8 GHz, or 3.9 GHz; even more preferably at least 4.0 GHz, 4.1 GHz, or 4.2 GHz, or 4.3 GHz, or 4.4 GHz, or 4.5 GHz, or 4.6 GHz, or 4.7 GHz, or 4.8 GHz, or 4.9 GHz; even more preferably at least 5.0 GHz, or 5.1 GHz, or 5.2 GHz, or 5.3 GHz, or 5.4 GHz, or 5.5 GHz, or 5.6 GHz, or 5.7 GHz, or 5.8 GHz, or 5.9 GHz.

The generated microwaves may be within a frequency range of at least 2.0 GHz to at most 6.0 GHz; more preferably at least 2.5 GHz to at most 6.0 GHz; even more preferably at least 3.0 GHz to at most 6.0 GHz; even more preferably at least 3.5 GHz to at most 6.0 GHz; even more preferably at least 4.0 GHz to at most 6.0 GHz; even more preferably at least 4.5 GHz to at most 6.0 GH; even more preferably at least 5.0 GHz to at most 6.0 GHz; even more preferably at least 5.5 GHz to at most 6.0 GHz; even more preferably at least 5.6 GHz to at most 5.9 GHz, or at least 5.7 GHz to at most 5.9 GHz. It is moreover understood that the above-listed preferred microwave frequencies form part of the above-listed preferred microwave frequency ranges.

Systems of the art are typically focused on emitting lower frequency microwaves, for example below 2.0 GHz, onto a broad target area and as a consequence affect all plant tissue, roots and seeds growing in the target area, i.e., including non-weed plants such as crops or foliage. This has the result that the killing of weed plants requires a significant power output when applying lower frequency non-focused microwaves, which in turn requires longer exposure times (i.e. slow driving speeds) and/or higher power generation (i.e. heavier battery or generator). Moreover, these lower frequency microwaves also have an unnecessarily deep penetration depth. As a result of this, even if similar systems of the art could demonstrate the potential of controlling the growth of weed by means of microwaves, they struggle to provide the efficiency required for competitive industrial applicability.

It was found that by emitting higher frequency microwaves, preferably between 2.0 GHz to 6.0 GHz with the frequencies at the higher end of this range forming even more preferred embodiments, the microwave energy can be focused such that an improvement in weed killing efficiency may be achieved. Also, the reduced penetration depth of the microwaves may remain at a level that is still suitable for killing of (above-soil) weed plant, thus making this limitation less relevant, while at the same time providing a substantial increase in power and efficiency. As such, the microwave frequency and the microwave power can be balanced to reliably and efficiently control weed growth without introducing significant technical drawbacks that could reduce the efficiency of the system, such as increased weight (e.g. battery, generator), long exposure times.

The present microwave unit may comprise a controllable microwave generator adapted for generating microwaves with a frequency suitable for killing weed. Specifically, the controllable microwave generator may be adapted for generating microwaves within the above-listed frequency ranges. The microwave unit may also comprise a plurality of microwave generators. In particular, the microwave unit may comprise two or more generators, each generator being adapted for generating microwaves within the above-listed frequency ranges. The herein-listed preferred frequency ranges are understood to also form preferred embodiments of the microwave generator.

A typical microwave generator provides an integrated solution designed to generate and transmit microwave power. The microwave generator may be functionally controllable such that the timing or properties of the microwaves can be controlled. In particular, the microwaves may be generated on demand, i.e., responsive to an input signal, which may be provided to the generator by a control system. Also, the properties of the microwaves, such as the power or amplitude and/or frequency, can be at least to a degree adjustable.

In some embodiments the microwave generator operates at a power between at least 10 W and most 4000 W, preferably 50 W to 3500 W, or 100 W to 3500 W, or 150 W to 3500 W, or 200 W to 3500 W, or 250 W and 4000 W, or between 500 W and 3500 W, or between 750 W and 3000 W, or between 1000 W and 2500 W, or between 1250 W and 2250 W, for example 1500 W, for example 1750 W, for example 2000 W.

The microwave unit may further comprise technology known in the art for generating, controlling, and transmitting the generated microwaves to the output antenna. This technology may include, but is not limited to, the following devices: a power supply (e.g. switch-mode, inductive, pulse, etc.), one or more sources, one or more amplifiers, one or more transformers, input and output connectors, waveguides or patch elements for transducing the microwaves, waveguide launchers, isolators and circulators other protection means, (directional) couplers, (automatic) tuners, various monitoring sensors, various control modules, and so on.

Conventional, tube-based microwave generators may suffer from limitation due to the magnetron systems being open loop. Therefore, these systems may only deliver an approximate energy output that may fluctuate over time and the target area. The inclusion of technology to compensate for the limitation, such as controllable antennas, may not enough to ensure an even distribution of the microwave energy over the target area. As such, the microwave generator is preferably a solid-state microwave generator. It was observed that such a system may be particularly well suited for weed control, which requires a more reliable generation of microwaves. In such an embodiment the amplifier is also preferably a solid-state power amplifier and the microwave unit may comprise features relevant for solid state systems.

In some embodiments, the solid state microwave generator operates at a power between 25 W to 400 W, preferably between 50 W to 375 W, or between 75 W and 350 W, or between 100 W and 325 W, or between 125 W and 300 W, or between 150 W and 275 W, or between 175 W and 250 W, or between 175 W and 225 W, for example 200 W. Combinations of power amplifiers may be used to arrive at the preferred operating power; for example to power a 200 W solid state generator two 100 W amplifiers may be provided, or four 50 W amplifiers, and so on.

Advantageously, the microwave unit may comprise a cooling unit for cooling the microwave generator. The cooling unit may comprise features commonly used in the art for cooling such systems, including, but not limited to, ventilators, heatsinks, and so on. Preferably the cooling unit is a liquid cooling system comprising an arrangement of fluid conduits and at least one pump for pumping cooling liquid through the liquid cooling system. The liquid cooling system may further comprise features commonly used in the art for such systems, including, but not limited to, fittings, adapters, ducts, valves, and so on. In this manner, microwave generator can be more efficiently cooled, which may improve the operation of its electronic components and improve the lifetime of the system.

Advantageously, thermal energy produced by the microwave unit may be captured and diverted to heat other components of the present system, such as components of the below described phased array antenna system. This may provide an efficient way of reducing the build-up of humidity in the electrical components, which is a typical issue for outdoor-use system.

The microwaves generated by means of the above-discussed microwave unit are radiated onto a target location, i.e., a surface to be treated with the microwaves for the purpose of controlling the growth of weed. The radiation may be performed through an array of antenna elements. The array may be formed by placing a group of antenna elements in close vicinity to each other, preferably along a line or in a grid. In particular, each adjacent antenna can be placed close enough such that the near-field of at least one antenna element partially overlaps with the near-field of at least one adjacent antenna element.

As a result of the above-described array arrangement, the microwaves radiated outwards by each of the adjacently arranged antenna elements can constructively and destructively interfere with each other such that the microwave energy will be amplified in one specific direction, the target direction, but will be attenuated in all other directions. The microwaves may thereby form a focused "microwave beam" instead of broadly radiating in all direction. For example, when two antenna elements are fed with sinusoidal microwaves having the same phase, the microwave beam will be formed in the forward direction running between these antenna elements.

The microwave beam profile can be represented by a main lobe wherein the power of the interfering microwaves is concentrated. Those skilled in the art may appreciate that because of the diffraction pattern of the microwaves a number of side lobes may be formed in other directions. However, these side lobes will have lower electromagnetic field strength than the main lobe. As such, the microwave beam as used herein refers to the main lobe that exhibits the greatest field strength. By focusing the microwave beam onto a target area containing a weed plant, the growth of said weed plant can be efficiently controlled the growth of weed, since the microwave intensity within the area covered by the microwave beam will be substantially stronger than that of broadly emitted microwaves using a conventional antenna.

The shape of the microwave beam depends on the near field length of the antenna elements, which may be determined from the antenna elements aperture size and the microwave wavelength. As such, in a fixed system without further adjustments, the direction and shape of the microwave beam will also be fixed. Nonetheless, by changing the phase of the microwaves flowing into each antenna element the direction of the microwave beam can be adjusted. Continuing the above example, if each of the antenna elements is fed with sinusoidal microwaves having a different phase, the forward direction of the microwave beam will be shifted sideways by an angle corresponding to the phase shift value. As a result, by controlling the phase of the microwaves flowing into each of the antenna elements, the direction of the emitted microwave beam can be steered sideways.

Control of the microwave beam direction may be referred to as "beam steering". The beam steering may be performed electronically, which is much more flexible and faster than the mechanical steering of a conventional antenna. Nonetheless, it noted that the effectiveness of a microwave beam may be reduced by extreme tilting of the microwave beam sideways. As a result, the present system is preferably configured to radiate the microwave beam substantially forward as a standard mode of operation and steer the microwave beam sideways when necessary. Advantageously, the microwave system may be provided with a rotatable base that can rotate part of the microwave unit sideways, preferably the phased array antenna system, such that the microwave beam forward can continue to be radiated substantially forward even if sideways tilting is required, for example if a different lane of plants is treated.

The present phased array antenna system may comprise a plurality of antenna elements, i.e., there may be two or more antenna elements. The antenna elements may be adapted for radiating the flowing microwaves outwards onto a target location, such as a soil or specific weed plant. The antenna elements may be arranged in close proximity to each other, such that the above-described interference of radiated microwaves can be accomplished. In particular, the antenna elements may be arranged such that each antenna element is located in the near-field region of an adjacent antenna element. Each antenna element can be configured to emit the provided microwaves simultaneously or sequentially, depending on the microwave phase.

The present phased array antenna system may comprise at least one power divider or splitter. A power divider may include a waveguide splitter adapted to divide the flowing microwaves into two or more preferably equal parts. Each part of the divided microwaves may be guided into an individual antenna element of the plurality of antenna elements. Alternatively, each part of the divided microwaves may be guided into another power divider, to further split the flowing microwaves. The power divider may be coupled between the microwave unit and the plurality of antenna elements. The power divider may typically split the flowing microwaves in one direction only.

The present phased array antenna system may comprise at least one phase shifter. A phase shifter is a device utilized to provide a phase shift to the microwave signal by adding propagation delay. For example, the phase of each individual antenna element may be changed to 45, 90, or 135 degrees. Preferably, the phase shifter is an electronic phase shifter which is controlled by a static voltage to allow faster and easier control of the phase shift, thus steering the microwave beam to a different direction. The power divider may be coupled between the microwave unit and the plurality of antenna elements. Moreover, depending on the application, the phase shifter may be coupled between the power divider and the plurality of antenna elements or between the microwave unit and the power divider.

The phased array antenna system may comprise further technology known in the art for controlling and radiating the microwaves generated by the microwave unit. This technology may include, but is not limited to, the following devices: a power supply (e.g. switch-mode, inductive, pulse, etc.), one or more amplifiers, one or more transformers, input and output connectors, waveguides or patch elements for guiding the flowing microwaves, waveguide launchers, isolators and circulators other protection means, (vacuum) pumps, (directional) couplers, (automatic) tuners, various monitoring sensors, various control modules, and so on.

The provision of a phased array antenna system may allow for treating a large surface of a target location while focusing the microwave power onto a small target area within said target location. This arrangement greatly increases the efficiency of a microwave system for the purposes of weed control. The antenna elements may be arranged in a linear fashion to form a linear phased array antenna system or in a planar fashion to form a planar phased array antenna system. These arrangements are clarified below.

For a linear phased array antenna system, the antenna elements are placed next to each other in a continuous line. The beam steering can be controlled by a single-phase shifter. This arrangement has the benefit of being less complex, but the beam steering will be limited to a single plane.

For a planar phased array antenna system, the antenna elements are arranged in a matrix in different direction. The beam steering requires a plurality of phase shifters, typically one phase shifter per antenna element. This arrangement has the benefit of enabling beam steering in two planes, but it requires a large number of phase shifter to do so.

Irrespective of the arrangement of the antenna element, the direction of the resulting microwave beam may be adjusted or steered by controlling the phase of the flowing microwaves. In particular, the value of the microwave phase shift provided by the at least one phase shifter may be controlled to obtain a steerable microwave beam.

Typically, each antenna element may be provided with at least one aperture through which the generated microwaves can be emitted onto the target area. The shape of the antenna elements may be adjusted depending on the desired microwave wavelength and the near field length of the antenna elements.

In an embodiment at least one antenna element, preferably all of the antenna elements of the plurality of antenna elements, may include a horn antenna. This type of antenna commonly consists of a guiding structure shaped like a horn to direct the microwaves in a beam. This guiding structure may have a rectangular plate or curved cross section with an aperture to emit the generated microwaves across the surface covered by said antenna. There are numerous modifications to the shape of a horn antenna and the microwave system is by no means limited to a particular type. Suitable horn antenna models may for example include pyramidal horn, conical horn sectoral horn exponential horn, and so on. Use of a horn antenna may have the benefit of reducing the complexity of the system.

In an embodiment at least one antenna element, preferably all of the antenna elements of the plurality of antenna elements, may include a dipole antenna. This type of antenna commonly consists of two identical conductive elements such as metal wires or rods. There are numerous modifications to the shape of a dipole antenna and the microwave system is by no means limited to a particular type.

In an embodiment at least one antenna element, preferably all of the antenna elements of the plurality of antenna elements, may include a patch antenna. This type of antenna commonly consists of patch of metal foil of specific shapes that are etched on the surface of a substrate, with a metal foil ground plane on the other side. Alternatively, the patch antenna may consist of a metal patch mounted above a ground plane using dielectric spacers. There are numerous modifications to the shape of a patch antenna and the microwave system is by no means limited to a particular type. In particular, a patch antenna etched into the surface of a printed circuit board may also be referred to as a microstrip antenna. Use of a patch/microstrip antenna may have the benefit of reducing the size of the system and providing the possibility to integrate the antenna elements into a protective casing.

In an embodiment at least one antenna element, preferably all of the antenna elements of the plurality of antenna elements, may include a slotted line or slot antenna. This type of antenna commonly consists of an elongated hollow body that serves as guiding structure to support the propagation of microwaves along the length of said antenna, with one or more apertures being provided along the longitudinal direction of said antenna to allow for transmitting microwaves in the direction of the aperture.

Further, the system may be configured to run different operating modes. Some exemplary operating modes are presented below. The skilled person understands that the presented exemplary operating modes may be adjusted further or even combined with each other.

Between rows mode: The direction of the microwave beam may be steered to focus on a target area running between rows of crops. This mode may allow controlling the growth of weed plants outside of the area designated for crops. This mode provides a fast and efficient way to remove invasive weed plant that could otherwise impede the growth of adjacent crops. Additionally, the efficiency of this mode may be improved by providing a means for detecting weed plants. The detection can for example be accomplished by the provision of a sensing unit in the present system, which is discussed further below.

In-row mode: The direction of the microwave beam may be steered to focus on a target area running along a row of crops. This mode may allow controlling the growth of weed plants within the area designated for crops. Additionally, the efficiency of this mode may be improved by providing a means for identifying weed plants, preferably such that they may be distinguished from crop plants. The identification can for example be accomplished by the provision of a sensing unit in the present system, which is discussed further below.

Height-mode: The focus of the microwave beam may be adjusted to align with a specific height of weed plants growing above the soil. This mode may provide an efficient way of eliminating weeds in an early to late development phase, e.g. as seedling with a narrow stem or as mature plant with a thick stem.

Soil-mode: The focus of the microwave beam may be adjusted to focus on a specific depth within the soil. This mode may provide an efficient way of eliminating weeds in a germination phase, i.e., as seeds.

The sensing unit may comprise a two-dimensional (2D) or three-dimensional (3D) camera. Preferably the camera is suitable for recording green colour, which may be particularly effective for detecting the presence of weed, for example growing between rows of crops. Full colour recording may be further preferable for identifying the presence of weed.

The sensing unit may be provided with an air blower arranged to blow heated air over the camera. Thermal energy to generate the heated air may be diverted from the microwave unit. The heated air may serve to avoid the build up of humidity in the lenses, which is common on fields, e.g. dew or fog. The sensing area may be cleared with cooling air diverted from the microwave generator.

The sensing unit may be provided with a stabilizing unit adapted to stabilize the sensing unit. The stabilizing unit may ensure that the camera is provided with the necessary stability and light to perform correct image capturing. The stabilizing unit may also be adapted to maintain a set between the sensing unit and the target location, for example by raising or lowering said sensing unit.

The processing unit may be operatively connected to the microwave unit e.g. the microwave generator such that it may control the generation of microwaves by the microwave unit (i.e., on or off), and/or it may control microwave specific parameters relevant to the generation of microwaves (e.g. frequency, intensity, exposure time).

The processing unit may be configured to determine from sensing data provided by the sensing unit the presence of a target at a target location. The target may be a weed to be removed or a crop to be avoided. The processing unit may also be configured to receive position data containing a pre-determined target weed at a target location. The position data may be a set of instructions contained on a local storage medium or be provided by an external source, such as remote-control unit (e.g. the cloud via an internet connection). This way the time between determination of a target and instructing the microwave systems can range from seconds, for example while the microwave systems is moving, up to weeks, for example when a field requires to repeated treatments.

The processing unit may be operatively connected to the sensing unit to receive sensing data. The sensing data may contain image data captured by the sensing unit. The processing unit may be configured for processing the sensing data for determining a target at a target location. The determining of a target at a target location may comprise a detection and/or identification of weed plants at said target location, as clarified below:

The processing may comprise a detection of a weed plant. In particular, the processor may be configured for determining the position of a target plant, which may be a weed plant, at a target area. The processing unit may thereby be configured for distinguishing between weed plants and environmental features, such as soil. Automated detection of weed plants may be particularly beneficial when the mobile microwave system runs in between rows mode, since typically every plant located between rows of crops will be a weed plant. For detection of weed plants a limited colour sensing data (e.g. only green or another colour) may be sufficient. The advantage of configuring the processing unit for detection of weed plants is that the necessary computation power and time can be reduced.

The processing may comprise an identification of weed plants. In particular, the processor may be configured for to determining the position of a target plant at a target area and subsequently identifying said target plant as a weed plant. The processing unit may thereby be configured for distinguishing between weed plants and non-weed plants, such as crops. Automated identification of weed plants may be particularly beneficial when the mobile microwave system runs in in-row mode, since it may allow for avoiding damaging the non-weed plants amongst the weed plants. For identification of weed plants extensive colour sensing data (e.g. full colour) may be preferable. Identification of weed plants may provide for a particularly efficient and user-friendly weed control system at the cost of increased data processing resources.

The processing unit may be operatively connected to the phased array antenna system e.g. the phase shifter for controlling the direction of the microwave beam. It may control or send instructions to the phased array antenna system of a target area, such that said a microwave beam emitted by the phased array antenna system may be steered to align with said target area. The processing unit may also be provided with a computing program to calculate the necessary microwave phase shift to steer the microwave beam. Preferably, the microwave phase shift is calculated from an angle formed between a plane formed by the aligned antenna elements and the target location. Additionally, it may provide targeting instructions to multiple phased array antenna systems, such that they can focus the microwave radiation on a single target to increase the radiation intensity.

Advantageously, the processing unit may be operatively connected to other components of the microwave unit and/or phased array antenna system to ensure correct generating, transmitting and emitting of the microwaves. Further specifics about the detecting and controlling embodiments of the processing unit are discussed further below.

The processing unit may be operatively connected to the vehicle or drive means. It may control or send instructions (e.g. navigational instructions like GPS coordinates) of a target location to the vehicle or drive means, such that said vehicle or drive means may drive the microwave system towards said location. Additionally, it may provide driving instruction about specific driving parameters, such as the speed (m/h). For example, the driving speed may be lowered when the microwave generator is on (i.e. microwaves are being generated) and increased when it is off. This way the targeted location can be treated via optical targeting. This way the targeted location can be treated via mechanical movement. Reduction of treatment time (e.g. 10-20 ms) may reduce the complexity of the system. It is the case that a low treatment window allows for the neglect of GPS tracking. Movement of the system over a rough field may have longer amplitude than the treatment window and thus be of lesser importance.

The system may comprise a body for housing at least part of the microwave unit in particular the generator and relevant ancillary components (e.g., electronics and electric connections) and/or the phased array antenna system. The housing may be provided with a bottom plate, which seats and fixes the microwave generator. The exterior of the housing may have a casing surrounding the periphery of the microwave unit to fully protect it from the exterior, e.g. rain, or it may have a protective cage only. Preferably the microwave generator is disposed near a bottom or edge surface of the body housing such that the generated microwaves may be guided directly into the phased array antenna system. Additionally, other electro-mechanical components for the operation of the microwave generator may also be disposed within the housing. The housing partially or preferably fully encloses and protects the inner components. Additionally, a waveguide may be provided between the microwave unit and the phased array antenna system to allow said phased array antenna system to be mounted distant from the microwave unit.

The system may be mounted or is mountable to a vehicle. The mounting implies that the system may be connected or fastened to this vehicle. The mounting may permanent or non-permanent, i.e. demountable. The vehicle may be provided with a supporting mechanism for mounting said system. The vehicle is preferably adapted to the system purpose.

In an embodiment the drive vehicle may be a farm vehicle. The system can be mounted or fastened to a self-propelled farm vehicle e.g. tractor, which may move along a track in a field while the system emits microwave energy onto the soil below. Alternatively, the system may be mounted onto a leading or trailing vehicle, which is pushed or pulled by a farm vehicle, respectively. This exemplary embodiment is particularly suited for weed management in an agricultural environment.

In an embodiment the drive vehicle may be a rail vehicle. The system may be mounted or fastened to a self-propelled rail vehicle e.g. train, which may move along a rail while the system emits microwave energy onto and around the tracks below. Alternatively, the system may be mounted onto a leading or trailing vehicle, which is pushed or pulled by a rail vehicle, respectively. This exemplary embodiment is particularly suited for weed management in a rail environment, e.g. for controlling weed growth along or between train tracks.

The system may alternatively be provided with a drive means configured for driving the system. The drive means typically includes a set of wheels mounted to a system body. The drive means may comprise further features known in the art for enabling the driving of said system, such as suspensions, brakes, gears, a transmission, and so on.

The vehicle or drive means may be manually operated, or is preferably self-driving. The self driving may be accomplished by connecting a control unit of said farm vehicle with a navigational system like GPS. Instructions from the control unit may be adjusted based on data from the sensing unit, e.g. by steering the vehicle or drive means towards a determined target weed present on a grid square of the generated detection grid.

The vehicle or drive means may be configured to drive at a speed of at least 10 m/h to at most km/h (10000 m/h) during operation of the microwave system (i.e. microwaves are being generated), preferably 100 m/h to 9.5 km/h (9500 m/h), or 200 m/h to 9.5 km/h (9000 m/h), or 300 m/h to 9.5 km/h (9000 m/h), or 400 m/h to 9.5 km/h (9000 m/h), or 500 m/h to 9.5 km/h (9000 m/h), or 600 m/h to 9.5 km/h (9000 m/h), or 700 m/h to 9.5 km/h (9000 m/h), or 800 m/h to 9.5 km/h (9000 m/h), or 900 m/h to 9.5 km/h (9000 m/h); more preferably 1.0 km/h (1000 m/h) to 9.0 km/h (9000 m/h), or 1.5 km/h (1500 m/h) to 9.0 km/h (9000 m/h), or 2.0 km/h (2000 m/h) to 9.0 km/h (9000 m/h), or 2.5 km/h (2500 m/h) to 9.0 km/h (9000 m/h), or 3.0 km/h (3000 m/h) to 9.0 km/h (9000 m/h), or 3.5 km/h (3500 m/h) to 9.0 km/h (9000 m/h), or 4.0 km/h (3500 m/h) to 9.0 km/h (9000 m/h), or 4.5 km/h (4500 m/h) to 9.0 km/h (9000 m/h); even more preferably 5.0 km/h (5000 m/h) to 8.5 km/h (8500 m/h), or 5.5 km/h (5500 m/h) to 8.5 km/h (8500 m/h), or 6.0 km/h (6000 m/h) to 8.0 km/h (8000 m/h), or 6.5 km/h (6500 m/h) to 8.0 km/h (8000 m/h), or 7.0 km/h (7000 m/h) to 8.0 km/h (8000 m/h), or 7.5 km/h (7500 m/h) to 8.0 km/h (8000 m/h). It was observed that the present system may achieve higher driving speed compared to systems of the art, which can reduce the times required to process fields and hence make the system more economical.

A further aspect of the present disclosure relates to a, preferably computer-implemented, method for controlling growth of weed in a field. It is appreciated that the herein described moveable microwave system, preferably the processing unit, may be configured to perform the herein described method or embodiments thereof. Preferred embodiments of the method are also preferred embodiments of the processing unit configuration, and vice versa.

The method for controlling growth of weed in a field may comprise the following steps:
  a) determining a position of a target weed plant at a target location;
  b) optionally, steering a vehicle or drive means to reach the target location;
  c) steering a microwave beam direction to align a target area with the position of the target weed plant; and
  d) emitting a focused microwave beam on the target area corresponding with the position of the target weed plant.

The determining of a position of a target weed plant may comprise one or more of the following,
  receiving target data corresponding with the position of target weed plant. The target data may be a set of instructions contained on a local storage medium or be provided by remote control unit (e.g. the cloud via an internet connection).
  detection of a target weed plant from sensing data provided by a sensing unit. The detection may refer to determining the position of a target plant, which may be a weed plant, at a target area. The detection may thereby allow for distinguishing between weed plants and environmental features, such as soil.
  identification of a target weed plant from sensing data provided by a sensing unit. The identification may refer to determining the position of a target plant at a target area and subsequently identifying said target plant as a weed plant. The identification may thereby allow for distinguishing between weed plants and non-weed plants, such as crops.

The detection and/or identification of a target weed plant may be performed from data captured by a sensing unit, such as a camera. Preferably the sensing unit data contain at least a green colour recording, which may be particularly effective for detecting the presence of weed, for example growing between rows of crops. Full colour recording may be further preferable. In a preferred embodiment, the identification of a target weed at a target location may include the steps of determining the presence of green colour. Preferred methods for detection and identification of a target weed plant are discussed below.

Preferably, the determining a position of a weed plant at a target location may comprise:
  i) generating a detection grid representative of a target location consisting of a plurality of detection grid squares;
  ii) receiving sensing data from a sensing unit representative of a segment of the target location and assigning said sensing data to the grid square corresponding with said segment of the target location;

iii) detecting the presence of a target weed in at least one grid square;

iv) flagging the at least one grid square in which the presence of a target weed plant is detected as the position of a target weed plant.

The detection grid may be a virtual representation of a real two-dimensional (2D) or three-dimensional (3D) surface, e.g. field or soil, consisting of a plurality of 2D or 3D grid squares. It is observed that for the general purposes of weed control a 2D detection grid may be sufficient. Nonetheless, steering of a microwave beam in two planes may require the implementation of 3D squares. The detection grid may link the position of the microwave system to the real surface either internally as travel distance from the present position of the microwave system (i.e. using the system as reference point) or externally through a navigational system (e.g. GPS coordinates or reference points), and/or a combination of both.

In an embodiment the detecting of the presence of a target weed in at least one grid square may comprise determining the presence of at least one selected colour in each grid square; and assigning a numerical value representative of the amount of selected colour to each grid square. The determination of a colour may be sufficient for distinguishing between weed plants and environmental features, such as soil, without further processing of other visual features such as shape or dimension.

In a preferred embodiment the detecting of the presence of a target weed in at least one grid square may comprise determining the presence of green colour in each grid square; and assigning a numerical value representative of the amount of green colour to each grid square. The determination of green colour may be sufficient tor distinguish between weed plants and environmental features, such as soil.

Each grid square may be attributed various (numerical) parameters representative of a microwave specific phase corresponding to the adjustment of the microwave phase of at least one phase shifter such that the orientation of a microwave beam may be steered towards said grid square and/or aligned with said grid square. The phase may be determined based on data comparing the current position of the microwave beam and the position of a target weed or the flagged grid square which the presence of a target weed plant is detected.

Each grid square may be attributed various (numerical) parameters representative of a microwave specific operating condition, which may include microwave frequency, microwave intensity, weed/soil exposure time, and/or number of treatment repetition. The operating condition may typically be constant across a single grid square. By increasing the number of squares in a certain grid, the accuracy of the method may be increased at the cost of increased computing power or time.

The detection may identify multiple target weeds positioned in different grid squares, thereby generating multiple positions of a target weed plant. In such a scenario the emitting of a focused microwave beam may be repeated for each flagged grid square. Preferably, the steering of the focused microwave beam may be controlled to optimise the path that the focused microwave beam follows, for example, to avoid going back and forth.

In particular, the method may comprise the steps:

d) emitting a focused microwave beam on a first target area (first flagged grid square) corresponding with the position of a first target weed plant;

e) steering the focused microwave beam direction to align with the position of a second target grid area (second flagged grid square) corresponding with the position of a second target weed plant;

f) repeating the above steps for each further target grid area (further flagged grid square) corresponding with the position of each further target weed plant.

Preferably, the identification of a weed plant at a target location may comprise:

I) detecting the presence of a plant;

II) determining a plant specific parameter for the detected plant;

III) comparing the determined plant specific parameter with specific parameters stored on a database;

IV) identifying the detected plant as a weed plant or a non-weed plant.

The determining of a plant specific parameter for a plant may comprise determining the spectral signature for said plant and preferably determining at least one spectral feature representative of said spectral signature. The spectral signature is the variation of reflectance or emittance of a material with respect to wavelengths (i.e., reflectance/emittance as a function of wavelength).

The determination of the spectral signature may be sufficient for distinguish between weed plants and non-weed plants, such as crops.

The identification of a target, such as weed or other plants, at a target location may be fully or partially automated by the provision of a machine learning model, which may provide for automatic interpretation of the relevant information and/or characteristic data with the presence or absence of weed. Various machine learning models can used to identify weed and optionally classify the identified weed into weed classes as known by those skilled in the art.

Preferably, the identifying may comprise identifying the plant as a target weed plant if the determined plant specific parameters correspond with plant specific parameters corresponding with a weed plant in said database;

identifying the plant as a target weed plant if the determined plant specific parameters do not correspond with plant specific parameters corresponding with a crop plant in said database; and/or;

identifying the plant as a non-weed plant if the determined plant specific parameters correspond with plant specific parameters corresponding with a crop plant in said database.

The identification of the target weed plant may be expanded to also identify the weed or non-weed plant type. Determining weed plant type may allow for adjusting the microwave specific parameter to improve the effect of the microwave beam on target weed plant, for example, by adjusting the microwave frequency, intensity, exposure time and/or optionally, a number of repetitions. The number of repetitions may also be adjusted based on non-plant specific parameters, for example, the period in the cultivation cycle, weather conditions, or user-input time periods (e.g. daily, weekly, monthly).

The steering of a microwave beam may comprise a controlling of a phase shifter of phased array antenna system to steer said microwave beam emitted by the phased array antenna system at a target area and/or align the microwave beam with said target area. In a preferred embodiment the method may comprise a step of adjusting the phase of the generated microwaves to steer a microwave beam emitted by the phased array antenna system at a target area and/or align the microwave beam with said target area. The targeted weed position can thus be treated without mechanical movement of the mobile microwave system.

The steering of a vehicle or drive means may comprise controlling of said vehicle or a drive means to drive the microwave system to reach the target location such that the phased array antenna system can target the output microwave beam corresponding to the microwave specific parameters at said target location. The targeted weed position can thus be treated through mechanical movement of the mobile microwave system.

A further aspect of the present disclosure relates to a use of the mobile microwave system for controlling weed in a field. The controlling may preferably include a burning, killing and/or lethal wilting of the weed. Exemplary weed plants may include Saltbush, bindweed, thistle, yarrow, shaggy soldier, summer purslane, red clover, peach herb, camomile, nettle, grass, maranth, Bermuda grass, Bindweed, Broadleaf plantain, Burdock, Common lambsquarters, Creeping charlie, Dandelion, Goldenrod, knotweed and the knotweed family, Kudzu, Leafy spurge, Milk thistle, Poison ivy, Ragweed, Sorrel, *Striga*, St. John's wort, Sumac, Tree of heaven, Wild carrot, White clover, Wood sorrel, Yellow nutsedge, pigweed, goosefoots, fools parsley, mercury and the spurge family, black nightshade, speedwell, and the like. By controlling the growth of weeds using the present system, the growth of desired plants such as crops may be improved, which may increase the yield of agricultural fields. Exemplary crop plants may include sugar beets, fodder beets, red beets, sugar cane, barley, maize, millet, rye, sorghum, wheat, cassava, potatoes, chicory, peas, beans, cabbages, carrots, flax, rapeseed, sunflower, vegetable crops like cabbages, fruit trees, berry shrubs, and the like.

EXAMPLES

To better illustrate the properties, advantages and features of the present disclosure some preferred embodiments of the system are disclosed as examples with reference to the enclosed figures. However, the scope of the present disclosure is by no means limited to one the illustrative examples presented below.

Example 1: Mobile Microwave System

Example 1 is described with reference to FIGS. 1 to 4, which show a preferred embodiment of a mobile microwave system (100) according to the present disclosure.

FIG. 1 is a schematic illustration of a phased array antenna system (350). The system (350) comprises four antenna elements (360) configured for emitting a focused microwave beam. The four antenna elements (360) are arranged in a linear fashion. The microwaves are generated by a microwave unit (200) and guided into each of the four antenna elements (360). Between the microwave unit (200) and the four antenna elements (360) a controllable phase shifter (370) is provided, which is coupled to at least two adjacent antenna elements (360). Moreover, a portion of the antenna elements (360) is provided with three antenna apertures (365).

Figure 2A:
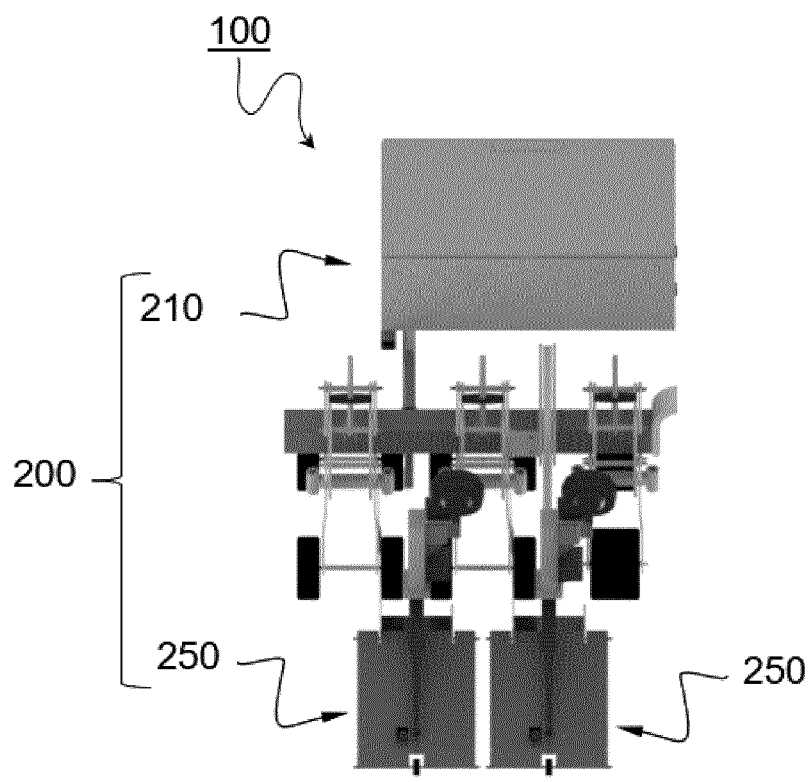
FIG. 2A is a top view of a mobile microwave system (100) according to a preferred embodiment of the present invention.
Figure 2B:
FIG. 2B is a perspective view of a mobile microwave system (100) according to a preferred embodiment of the present invention.

FIG. 2A is a schematic illustration of the mobile microwave system (100) comprising a controllable microwave unit (200). Microwave generator (200) is configured to generate microwaves of a frequency between 2.0 GHz and 6.0 GHz: for example at 5.8 GHz. The microwave system has a housing wherein a microwave generator (210) is disposed. The generator (210) is connected to two adjacently arranged leaky-wave antennas (250) that guides the flowing microwaves generated by said generated microwave generator (210) onto the soil below. The leaky-wave antenna (250) consists of a flat body that serves as guiding structure to support the propagation of microwaves along the surface of the antenna. This guiding structure may be a rectangular plate or circular dish that scatters the generated microwaves across the surface covered by said antenna. The leaky-wave antennas (250) are oriented downwards towards the soil surface. FIG. 2B is a picture of the mobile microwave system (100) mounted onto a vehicle (300), in particular a tractor.

Figure 3A:
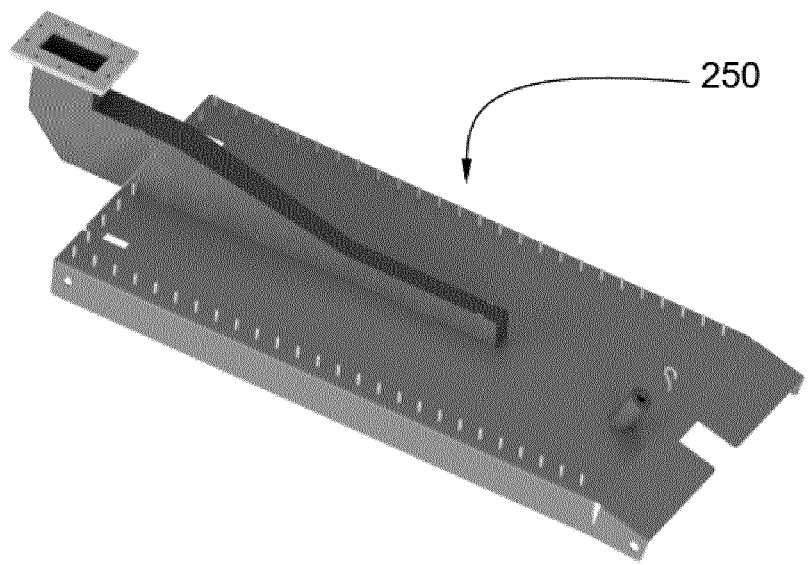
FIG. 3A is a top perspective view of a leaky-wave antenna (250) according to a preferred embodiment of the present invention.
Figure 3B:
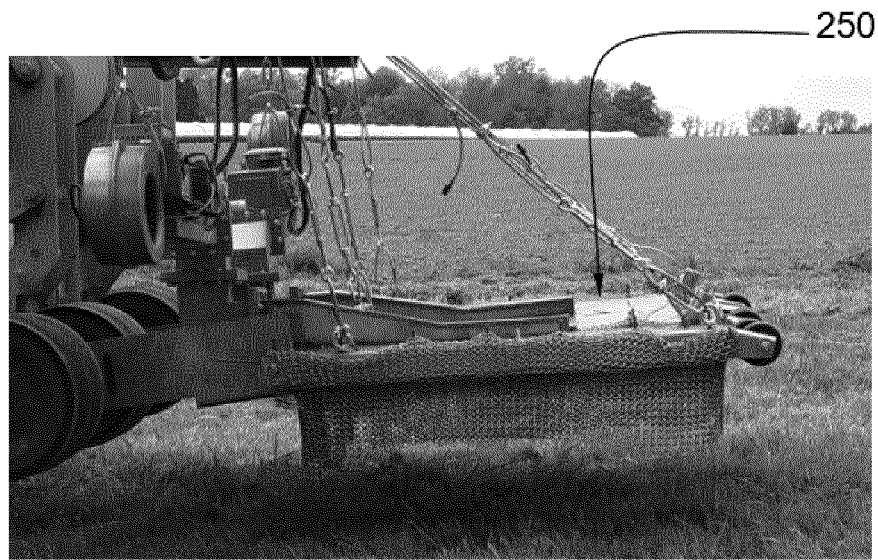
FIG. 3B is a side view of a leaky-wave antenna (250) according to a preferred embodiment of the present invention.

FIG. 3A is a detailed view of a leaky-wave antenna (250). The antenna consists of a flat guiding structure connecting to a waveguide mounted on top, which guides the flowing microwaves into the antenna, such that they can be scattered the surface of said antenna. The edges of the antenna (250) are provided with projections onto which metal chains (255) can be connected. FIG. 3B is a picture of a leaky-wave antenna (250) that has been provided with such metal chains (255) forming a shield around. It also shows the waveguide connections forming a guiding structure towards the generator.

Figure 4A:
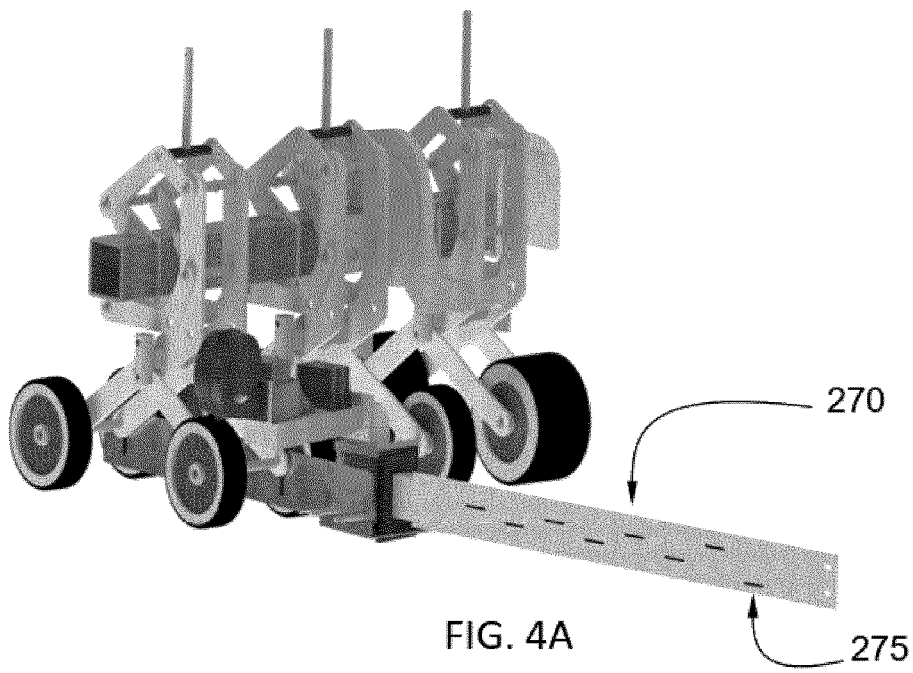
FIG. 4A is a top perspective view of a slotted line antenna (200) according to a preferred embodiment of the present invention.
Figure 4B:
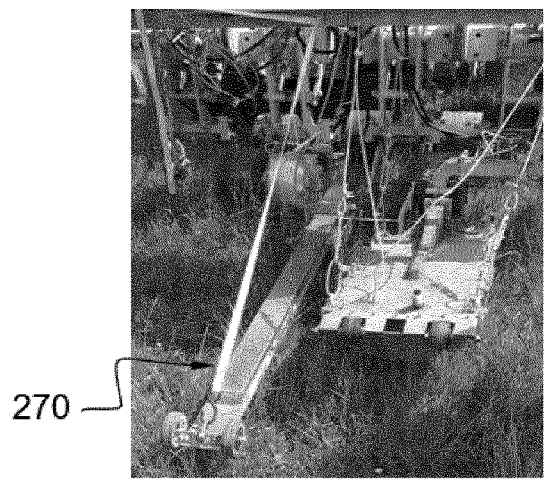
FIG. 4B is a top perspective view of a slotted line antenna (200) oriented downwards according to a preferred embodiment of the present invention.

FIG. 4A is a detailed view of a slotted line antenna (270). The slotted line antenna (270) consists of an elongated guiding structure provided with a plurality of apertures along one side of said structure. The guiding structure connects to a waveguide, which guides the flowing microwaves into the antenna, such that they can be emitted through the plurality of apertures. FIG. 4B is a picture of a slotted line antenna (270) that has been oriented downwards towards the soil below; i.e. the side of the antenna (270) provided with apertures is oriented towards the soil. FIG. 4B is a picture of a slotted line antenna (270) that has been oriented sideways; i.e. the side of the antenna (270) provided with apertures is oriented sideways, such that the apertures run parallel to the soil.

Example 2: Experimental Data (Lab Test)

Experimental lab tests were performed to assess the feasibility of microwave weed killing by means of a set-up comprising a microwave generator (210) connected to a slotted line antenna (270). In the present experiment the microwaves are transmitted by a slotted line antenna (270) and exit through an aperture to reach a plant, such as weed (400). The between the aperture and the weed (400) is typically in the mm range. The dashed line represents the surface (i.e. a cylinder) by which the power of the microwaves emitted from the illustrated aperture is divided. For example, if the distance equals 0 mm and the aperture is a rectangular slot of 6*60 mm, the surface will equal the surface area of said aperture.

The following plant varieties were selected for testing: Saltbush, bindweed, thistle, yarrow, shaggy soldier, summer purslane, red clover, peach herb, camomile, nettle, grass. Each plant was exposed to an aperture of a slotted line antenna. The generated microwaves had a frequency of 2.4 to 5.8 GHz. The impact of the following variables was verified: power (1.5 kW or 3.0 kW power), stem thickness (1.0, 2.0, 3.0, 4.0 or 4.5 mm), and distance from antenna (0, 1.2 or 2.4 mm). The heating rate was filmed by means of a thermal camera that measured the heating between 30° C. to 50° C.

The results are presented in the Table below,

| Plant | Power (kW) | Stem thickness (mm) | Distance (mm) | Heating speed between 30° C. and 50° C. (° C./sec) |
|---|---|---|---|---|
| Saltbush | 1.5 | 4.5 | 0 | 4.347826 |
| Saltbush | 1.5 | 3 | 0 | 5.952381 |
| Saltbush | 1.5 | 2 | 0 | 26.31579 |
| Saltbush | 3 | 4.5 | 0 | 8.62069 |
| Saltbush | 3 | 3 | 0 | 9.615385 |
| Saltbush | 3 | 2 | 0 | 21.73913 |
| nettle | 1.5 | 3 | 0 | 5.952381 |
| nettle | 1.5 | 2 | 0 | 17.85714 |
| nettle | 3 | 3 | 0 | 21.73913 |
| nettle | 3 | 2 | 0 | 16.66667 |
| bindweed | 1.5 | 1 | 0 | 12.19512 |
| bindweed | 3 | 1 | 0 | 18.51852 |
| nettle | 1.5 | 2 | 1.2 | 4.716981 |
| nettle | 3 | 2 | 1.2 | 11.11111 |
| nettle | 3 | 2 | 2.4 | 8.333333 |
| nettle | 1.5 | 2 | 2.4 | 3.184713 |
| thistle | 1.5 | 3 | 0 | 5.555556 |
| thistle | 3 | 3 | 0 | 12.19512 |
| yarrow | 3 | 3 | 0 | 19.23077 |
| yarrow | 1.5 | 3 | 0 | 9.433962 |
| shaggy soldier | 1.5 | 3 | 0 | 2.232143 |
| shaggy soldier | 3 | 3 | 0 | 19.23077 |
| summer purslane | 3 | 3 | 0 | 7.042254 |
| summer purslane | 1.5 | 3 | 0 | 7.246377 |
| red clover | 1.5 | 1 | 0 | 35.71429 |
| red clover | 3 | 1 | 0 | 62.5 |
| peach herb | 3 | 4 | 0 | 10.41667 |
| peach herb | 1.5 | 4 | 0 | 9.259259 |
| peach herb | 1.5 | 2 | 0 | 27.77778 |
| peach herb | 3 | 7 | 0 | 50 |
| camomile | 3 | 2 | 0 | 100 |
| camomile | 1.5 | 2 | 0 | 20.83333 |
| camomile | 1.5 | 2 | 1.2 | 5.882353 |
| camomile | 3 | 2 | 1.2 | 11.62791 |
| shaggy soldier | 3 | 2 | 1.2 | 12.82051 |
| shaggy soldier | 1.5 | 2 | 1.2 | 3.846154 |
| shaggy soldier | 1.5 | 2 | 2.4 | 2.483444 |
| shaggy soldier | 3 | 2 | 2.4 | 5.617978 |
| camomile | 3 | 2 | 2.4 | 8.064516 |
| camomile | 1.5 | 2 | 2.4 | 3.703704 |
| grass | 1.5 | 3 | 0 | 2.392344 |
| grass | 3 | 3 | 0 | 4.424779 |

In order to compare samples with different testing variables, the heating speeds are converted to a unit that takes into account the distance from the plant to the antenna and the irradiated microwave power. The selected unit is the heating rate (° C./s) divided by the power per surface at the location of the plant (W/cm$^2$). The power per area of the plant is calculated by dividing the power of a slot of said antenna by the area of a cylinder between said slot and that of a chosen plant.

The first element to be considered is the dielectric loss factor. There is a correlation between speed and uniformity of heating. If the product is a good absorber of radiation, the penetration depth is small so that radiation does not penetrate to the centre, which means an inhomogeneous heating and therefore a reduction of the speed of heating that is not compensated by thermal conduction or direct heating. It is, for example, possible to use lower frequencies for high loss factor products and higher frequencies for low loss factors.

If the average heating rate of the plants at distance 0 is calculated, it results in 12.9° C./s for 1.5 kW input power and 25.5° C./s for 3 kW input power. If this value is divided by the power per area, 0.248 and 0.245 [(° C./s)/(W/cm$^2$)] is obtained for 1.53 kW and 3 kW of irradiated microwave power, respectively. Based on these calculations it can be observed that if the microwave power is doubled, the heating rate will also double.

The impact of the plant stem thickness on the average heating rate is shown in the Table below,

| plant stem thickness (mm) | average heating rate (° C./s W/cm$^2$) |
|---|---|
| 1 mm | 0.283 |
| 2 mm | 0.300 |
| 3 mm | 0.078 |
| 4 mm | 0.093 |
| 4.5 mm | 0.056 |

Further, the impact of power on the on the average heating rate is shown in the Table below,

| plant stem thickness (mm) | average heating rate (° C./s W/cm$^2$) for Power = 52 W/cm$^2$ | average heating rate (° C./s W/cm$^2$) for Power = 104 W/cm$^2$ |
|---|---|---|
| 2 mm | 0.337 | 0.139 |
| 3 mm | 0.076 | 0.062 |
| 4.5 mm | 0.056 | 0.055 |

The above tables demonstrate that that thinner plant stems tend to heat up faster. It is concluded that thinner stems may contain more fluid, which results in a higher dielectric loss factor.

Figure 5:
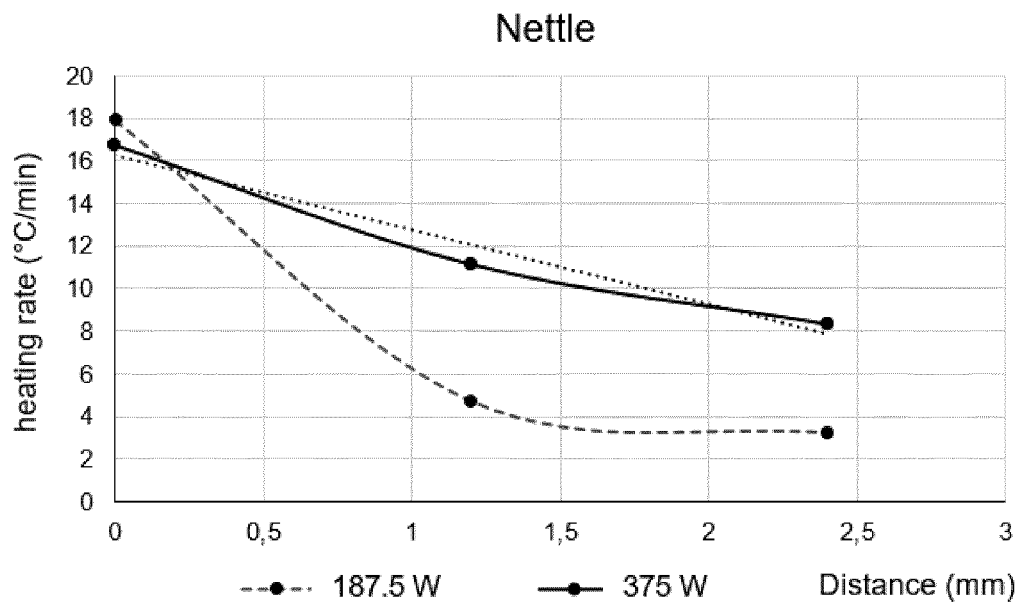
FIG. 5 shows the experimental results of a heating rate test performed on nettle. The experimental set-up is discussed in Example 2.

The impact of distance on the average heating rate (of nettle) is shown in the Tables below. The results of this Table are graphically represented in FIG. 5.

| Nettle | average heating rate (° C./s W/cm$^2$) for Distance X = 0 mm | average heating rate (° C./s W/cm$^2$) for Distance X = 1.2 mm$^2$ | average heating rate (° C./s W/cm$^2$) for Distance X = 2.4 mm |
|---|---|---|---|
| 187.5 W/slot | 17.9 | 4.7 | 3.2 |
| 375 W/slot | 16.7 | 11.1 | 8.3 |
| Surface (cm$^2$) | 3.6 | 20.27 | 42.29 |
| ln W/cm$^2$ | | | |
| 187.5 W/slot | 52.1 | 9.3 | 4.4 |
| 375 W/slot | 104.2 | 18.5 | 8.9 |
| ln ° C./s W/cm$^2$ | | | |
| 187.5 W/slot | 0.3437 | 0.5081 | 0.7217 |
| 375 W/slot | 0.1603 | 0.6000 | 0.9360 |

The impact of distance on the average heating rate (of camomile) is shown in the Tables below.

Figure 6:
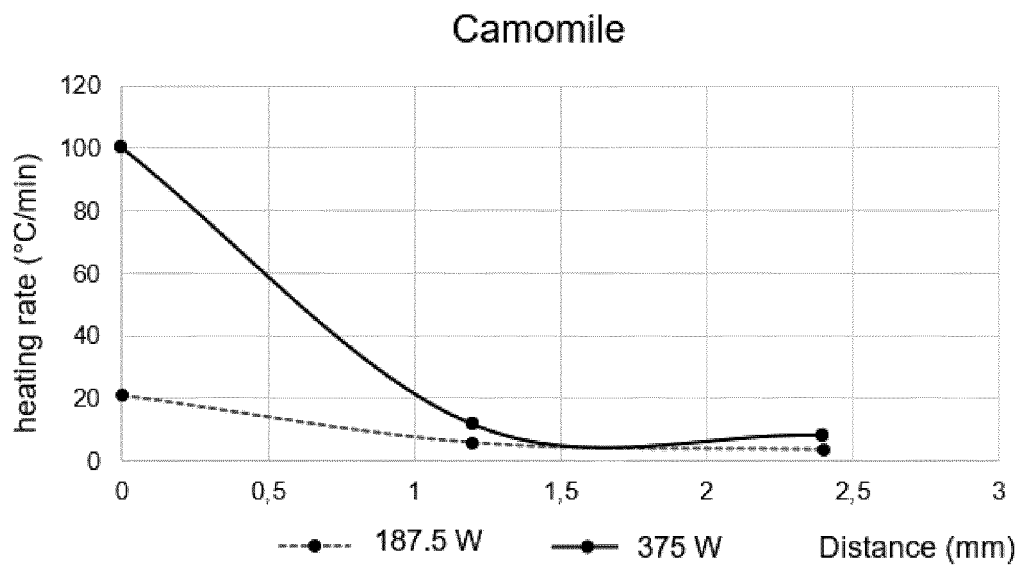
FIG. 6 shows the experimental results of a heating rate test performed on camomile. The experimental set-up is discussed in Example 2.

The results of this Table are graphically represented in FIG. 6.

| camomile | average heating rate (° C./s W/cm$^2$) for Distance X = 0 mm | average heating rate (° C./s W/cm$^2$) for Distance X = 1.2 mm$^2$ | average heating rate (° C./s W/cm$^2$) for Distance X = 2.4 mm |
|---|---|---|---|
| 187.5 W/slot | 20.8 | 5.9 | 3.7 |
| 375 W/slot | 100 | 11.6 | 8.1 |
| Surface (cm$^2$) | 3.6 | 20.27 | 42.29 |
| ln W/cm$^2$ | | | |
| 187.5 W/slot | 52.1 | 9.3 | 4.4 |
| 375 W/slot | 104.2 | 18.5 | 8.9 |
| ln ° C./s W/cm$^2$ | | | |
| 187.5 W/slot | 0.3994 | 0.6378 | 0.8345 |
| 375 W/slot | 20.8 | 5.9 | 3.7 |

The presented results demonstrate that killing plants is indeed feasible using microwaves. Nonetheless, it is noted that the heating rate may vary between different plant varieties.

Example 3: Experimental Data (Field Test)

Figure 4C:
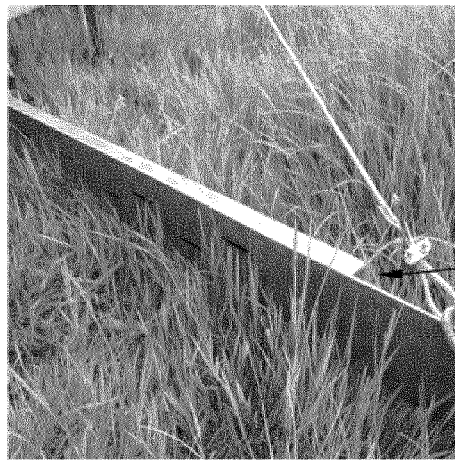
FIG. 4C is a perspective view of a slotted line antenna (200) oriented sideways according to a preferred embodiment of the present invention.

Experimental field tests were performed to assess the efficiency of weed killing by means of microwaves. Two microwave generators having different max output powers were tested, in particular for generating 2 kW and 3 kW microwaves. The microwaves were generated at a frequency of 2.4 GHz. Two types of antennas were tested, namely a leaky-wave antenna, as shown in FIGS. 3A and 3B, and a slotted line antenna, as shown in FIGS. 4A, 4B and 4C. The antennas were mounted in front of the tractor, such that the plants wouldn't be flattened by its wheels prior to the microwave treatment. The above-described possible system set-ups were tested on a grass field and on a beet field, respectively. The results are presented below.

Figure 7:
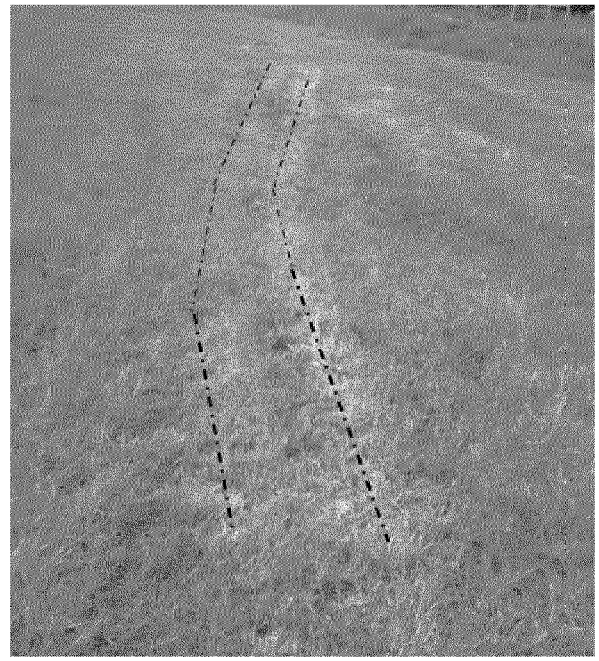
FIG. 7 shows the experimental results of a control test performed on a grass field with a leaky-wave antenna (250). The experimental set-up is discussed in Example 3.

The first system set-up comprising the leaky-wave antenna was driven over a grass field at a speed of 90 m/h. The test results (captured 2 days after treatment) are shown in FIG. 7. In particular, two tracks have appeared on the grass field: the left track shows the results of the system operating at 2 kW microwaves, whereas the right track shows the results at 3 kW. It may be appreciated that following each treatment the grass was completely discoloured, from a green colour to a brown-yellow colour, which is indicative of dead grass. However, since the discolouring is difficult to see on grayscale, the figure has been provided with a dashed line to guide the eyes over the discoloured tracks. The temperature of the grass (measured immediately after treatment) was 37° C. for 2 kW and 40° C. for 3 kW. It can thus be seen from the degree of discolouring that the 3 kW microwaves (right) were more effective at killing the grass than the 2 kW microwaves.

Figure 8:
FIG. 8 shows the experimental results of a control test performed on a beet field with a downwards arranged slotted line antenna (200). The experimental set-up is discussed in Example 3.
Figure 9:
FIG. 9 shows the experimental results of a control test performed on a beet field with a sideways arranged slotted line antenna (200). The experimental set-up is discussed in Example 3.

The second system set-up comprising the slotted line antenna was driven at speeds of 70, 100, 200 and 400 m/h over a beet field in two different configurations, namely with the apertures oriented downwards towards the soil and with the apertures oriented sideways parallel with the soil. The tests were performed using a system operating at 3 kW microwaves. The test result of the first configuration (downwards) is shown in FIG. 8. In particular, it is shown that a stem of a plant has been burned, causing the upper part to hang over and become wilted with time. The place of treatment is indicated with a dashed line to guide the eyes. The test result of the second configuration (sideways) is shown in FIG. 9. In particular, it is similarly shown that a stem of two plant have been burned, causing the upper parts to hang over and become wilted with time. The height of treatment is indicated with a dashed line to guide the eyes. The position of the burn corresponds with the height of the aperture of the slotted line antenna, thereby confirming that the microwaves are the cause of the burn. Also, the temperature of the plants (measured immediately after treatment) was 40-50° C. for 70 m/h and 25-35° C. for 400 m/h. It was noted that plants should preferably reach a min temperature of 50° C. to result in definite killing.

Example 4: Automated Determination of a Target

Figure 10:
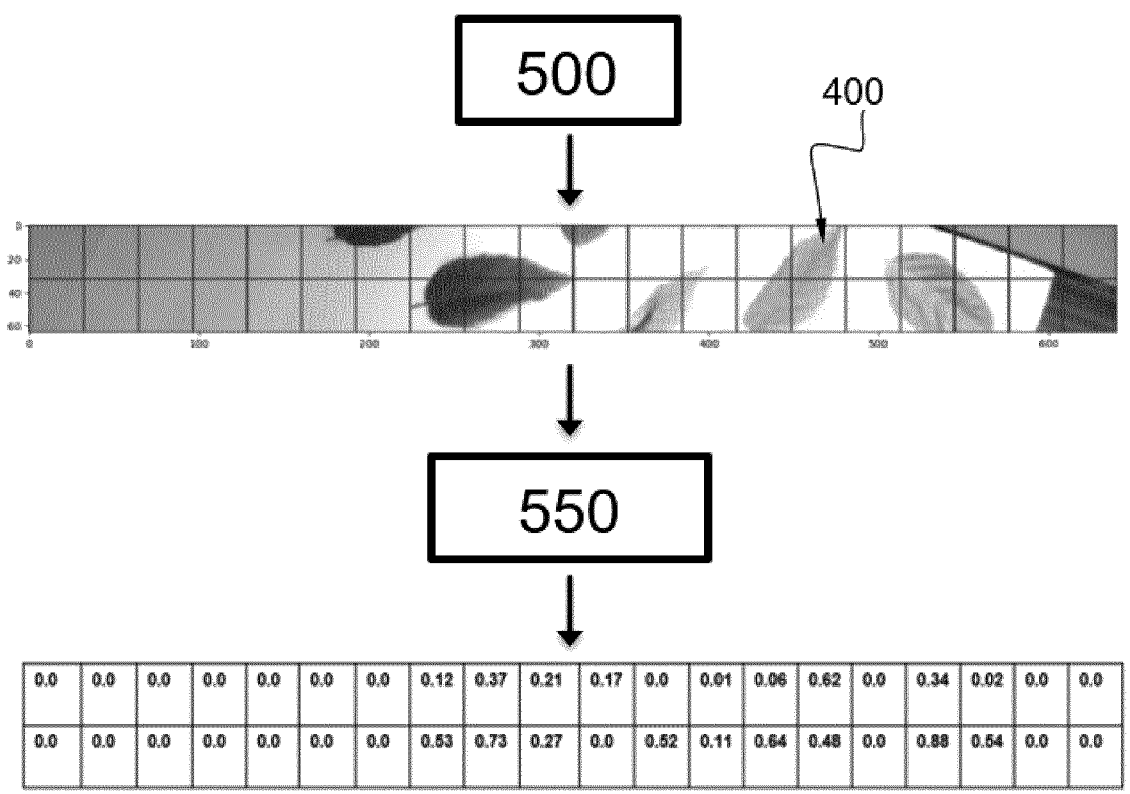
FIG. 10 shows an exemplary method for automated determination of weed (400) from image data captured by a sensing unit (500). The method is discussed in Example 4.

A preferred method for automated detection of weed from sensing data provided by a sensing unit (500) is explained with reference to FIG. 10. The sensing unit (500) in this example is a Raspberry Pi (RPi) camera capturing images at a resolution of 8 MP. The captured images contain multiple weed plants (400). The image data is transferred to a processing unit (550) that generates a detection grid representative of the surface captured by the camera, the grid is divided into 40 grid squares, each grid square representing a real position on the captured surface.

The processing unit (550) runs a green colour detection algorithm that assigns a numerical number to each square, the number representing the amount of detected colour. The processing unit (550) thereby generates an array of 0 and 1, which may be used to control the mobile microwave system (100) to target at a weed plant at the determined location.

Figure 11:
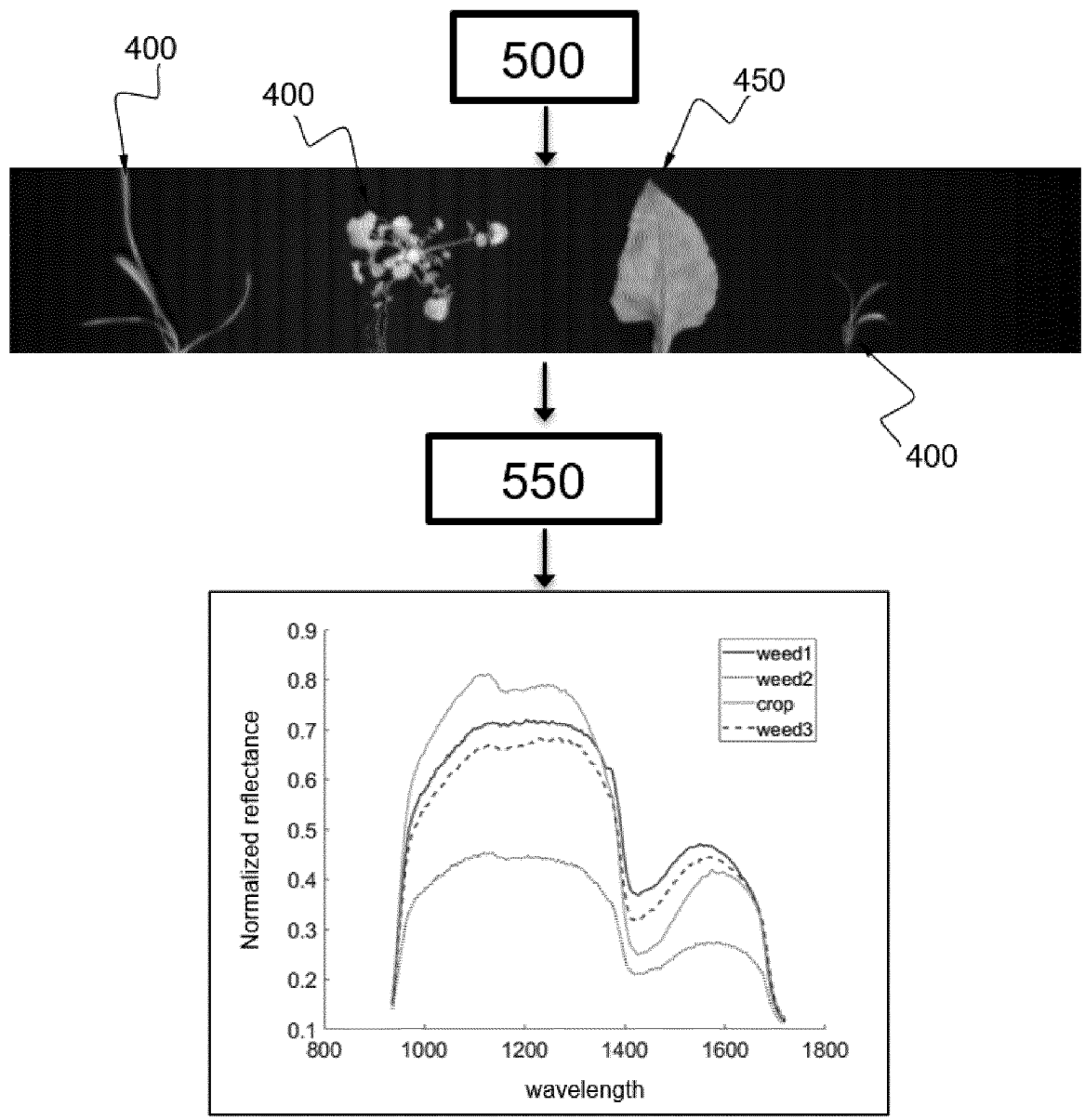
FIG. 11 shows an exemplary method for automated identification of weed (400) and non-weed (450) from image data captured by a sensing unit (500). The method is discussed in Example 4.

This automated detection algorithm may be advantageously used for distinguishing between weed plants and environmental features, such as soil, in a mobile microwave system (100) running in a between rows mode. Further, a preferred method for automated identification of weed from sensing data provided by a sensing unit (500) is explained with reference to FIG. 11. The sensing unit in this example is a RGBA image camera. The captured images contain three weed plants (400) and a single non-weed plant (450) in particular a crop plant. The spectral signature (reflectance/emittance as a function of wavelength) for each plant determined based on the captured images to determine a plant specific parameter. The processing unit (550) runs a detection algorithm that compares the determined spectral images of each plant with each other and/or a database of spectral images of known plants. The processing unit assigns one or more features based to spectral images of each plant, which features may be used to identify a weed (400) and a non-weed plant (450). The identification of a plant may be used to control the mobile microwave system (100) to target a target weed plants and avoid non-weed plants in the target location.

This automated detection algorithm may be advantageously used for distinguishing between weed plants and environmental features, such as soil, in a mobile microwave system (100) running in a between rows mode. The identification may be performed with the aid of machine learning algorithms such as a classifier unit.

The invention claimed is:

1. A mobile microwave system for controlling weed growth in a target location, such as an agricultural field, the mobile microwave system comprising
a microwave unit comprising
a microwave generator for generating microwaves within a frequency range suitable for controlling the weed growth;
a phased array antenna system comprising
a plurality of antenna elements configured for emitting a focused microwave beam within a target area;
at least one controllable phase shifter coupled between the microwave unit and the plurality of antenna elements;
wherein the phase shifter is configured for shifting a microwave phase of at least a part of the generated microwaves in order to adjust a direction of the focused microwave beam; and
a processing unit operatively connected to the phase shifter and configured to steer the focused microwave beam direction to align the target area with a position of a target weed plant in the target location;
wherein the mobile microwave system is mountable to a vehicle or a vehicle comprises a drive for moving said mobile microwave system.

2. The system according to claim 1, wherein the microwave generator generates microwaves of a frequency between 2.0 GHz and 6.0 GHz; for example at 5.8 GHz.

3. The system according to claim 1, wherein the plurality of antenna elements is arranged in a substantially linear fashion; preferably wherein at least one antenna element comprises one or more antenna apertures.

4. The system according to claim 1, wherein at least one antenna element, preferably all antenna elements, of the plurality of antenna elements is a horn antenna, dipole antenna and/or a patch antenna.

5. The system according to claim 1, comprising a sensing unit operatively connected to the processing unit and configured for sensing the target weed in the target location;
wherein the processing unit is configured to
receive, from the sensing unit, sensing data representative a target location;
determine, from the sensing data, the position of the target weed plant; and
steer the microwave beam direction to align the target area with the determined position of the target weed plant.

6. The system according to claim 5, wherein the processing unit is configured to
generate a detection grid representative of a target location consisting of a plurality of detection grid squares;
receive sensing data from the sensing unit representative of a segment of the target location and assigning said sensing data to the grid square corresponding with said segment of the target location;
detect the presence of a target weed in at least one grid square;
flag the at least one grid square in which the presence of a target weed plant is detected as the position of a target weed plant; and,
steer the microwave beam direction to align the target area with the determined position of the flagged grid square.

7. The system according to claim 5, wherein the sensing unit comprises a camera configured for recording at least green colour and the processing unit is configured to determine a green colour value and detect, from the green colour value, the position of the target weed plant.

8. The system according to claim 5, wherein the sensing unit comprises a camera configured for recording full colour spectrum and the processing unit is configured to determine a spectral signature and identify, from the spectral signature, a type of plant and the position of the target weed plant.

9. The system according to claim 1, wherein the processing unit is configured to control a vehicle, or a drive to drive the mobile microwave system to the target location and/or the position of the target weed plant.

10. A computer-implemented method for controlling weed growth in a target location, such as an agricultural field, executed by the mobile microwave system as claimed in claim 1, the method comprising:
a) determining a position of the target weed plant in the target location;
b) optionally, steering a vehicle or drive means to reach the target location;
c) steering a microwave beam direction to align a target area with the position of the target weed plant; and
d) emitting a focused microwave beam on the target area corresponding with the position of the target weed plant.

11. The method according to claim 10, wherein the determining of a position of a target weed plant comprises
A) generating a detection grid representative of a target location consisting of a plurality of detection grid squares;
B) receiving sensing data from a sensing unit representative of a segment of the target location and assigning said sensing data to the grid square corresponding with said segment of the target location;
C) determining the presence of a target weed in at least one grid square; and
D) flagging the at least one grid square in which the presence of a target weed plant is detected as the position of a target weed plant.

12. The method according to claim 10, wherein the emitting of a focused microwave beam on the target area comprises
d) emitting a focused microwave beam on a first target area, preferably a first flagged grid square, corresponding with the position of a first target weed plant;
e) steering the focused microwave beam direction to align with the position of a second target grid area, preferably a second flagged grid square, corresponding with the position of a second target weed plant; and
f) repeating the above steps for each further target grid area, preferably further flagged grid square, corresponding with the position of each further target weed plant.

13. The method according to claim 10, wherein determining the presence of a target weed comprises
i) determining the presence of green colour in each grid square;
ii) assigning a numerical value representative of the amount of green colour to each grid square; and
iii) detecting the presence of the target weed plant in each grid square if the assigned numerical value exceeds a pre-determined threshold value.

14. The method according to claim 10, wherein determining the presence of a target weed comprises
I) detecting the presence of a plant;
II) determining a plant specific parameter for the detected plant, said plant specific parameter including at least a spectral signature for said plant;
III) comparing the determined plant specific parameter with data stored on a database, said data including at least spectral signature data corresponding to a weed plant and/or a non-weed plant; and
IV) identifying the detected plant as a weed plant or as a non-weed plant.

15. A method for controlling the growth of a target weed in a target location, comprising the steps of:
(1) providing a mobile microwave system as claimed in claim 1; and
(2) directing a microwave beam generated by the mobile microwave system at the weed in the target location.

16. The method according to claim 15, wherein the target weed comprises a plant or seed thereof selected from the group consisting of saltbush, bindweed, thistle, yarrow, shaggy soldier, summer purslane, red clover, peach herb, camomile, nettle, grass, maranth, bermuda grass, bindweed, broadleaf plantain, burdock, common lambsquarters, creeping charlie, dandelion, goldenrod, knotweed and the knotweed family, kudzu, leafy spurge, milk thistle, poison ivy, ragweed, sorrel, *striga*, st john's wort, sumac, tree of heaven, wild carrot, white clover, wood sorrel, yellow nutsedge, pigweed, goosefoots, fools parsley, mercury and the spurge family, black nightshade and speedwell.

\* \* \* \* \*